United States Patent
Alexander

(10) Patent No.: US 7,515,916 B1
(45) Date of Patent: Apr. 7, 2009

(54) METHOD AND APPARATUS FOR MULTI-DIMENSIONAL CHANNEL SOUNDING AND RADIO FREQUENCY PROPAGATION MEASUREMENTS

(75) Inventor: Thomas Alexander, Mulino, OR (US)

(73) Assignee: Veriwave, Incorporated, Beaverton, OR (US)

( * ) Notice: Subject to any disclaimer, the term of this patent is extended or adjusted under 35 U.S.C. 154(b) by 857 days.

(21) Appl. No.: 10/944,759

(22) Filed: Sep. 21, 2004

Related U.S. Application Data

(60) Provisional application No. 60/505,419, filed on Sep. 22, 2003.

(51) Int. Cl.
*H04Q 7/20* (2006.01)
(52) U.S. Cl. .................... 455/456.1; 345/582
(58) Field of Classification Search .............. 455/456.1
See application file for complete search history.

(56) References Cited

U.S. PATENT DOCUMENTS

| | | | |
|---|---|---|---|
| 3,560,985 A | 2/1971 | Lyon | |
| 4,063,250 A | 12/1977 | Fenwick | |
| 4,955,002 A | 9/1990 | Campbell | |
| 5,184,330 A | 2/1993 | Adams et al. | |
| 5,228,055 A | 7/1993 | Uchida et al. | |
| 5,230,076 A | 7/1993 | Wilkinson | |
| 5,544,525 A | 8/1996 | Peterman et al. | |
| 5,731,699 A | 3/1998 | O'Byrne | |
| 5,822,380 A | 10/1998 | Bottomley | |
| 6,031,831 A | 2/2000 | Tan Boon et al. | |
| 6,317,599 B1 | 11/2001 | Rappaport et al. | |
| 6,330,452 B1 * | 12/2001 | Fattouche et al. | ........ 455/456.1 |
| 6,417,805 B1 | 7/2002 | Hershey et al. | |
| 6,442,507 B1 | 8/2002 | Skidmore et al. | |
| 6,449,215 B1 | 9/2002 | Shell | |
| 6,483,814 B1 | 11/2002 | Hsu et al. | |
| 6,499,006 B1 | 12/2002 | Rappaport et al. | |
| 7,019,753 B2 * | 3/2006 | Rappaport et al. | .......... 345/582 |

OTHER PUBLICATIONS

Ohira, "An Analog Aerial Beamforming Approach to Trained and Blind Smart Antennas", *ATR Adaptive Communications Research Laboratories*.

* cited by examiner

*Primary Examiner*—Lester Kincaid
*Assistant Examiner*—Charles Shedrick
(74) *Attorney, Agent, or Firm*—Dennis R. Haszko

(57) ABSTRACT

Apparatus and methods facilitating a distributed approach to measuring the RF propagation characteristics of an indoor area or region are described. Such measurements are particularly useful during the installation and management of indoor wireless data communication networks, such as Wireless Local Area Networks (WLANs). A plurality of sounder units may be geographically distributed at arbitrary points in a two-dimensional area surrounding the indoor area or region whose RF propagation characteristics are to be measured. These sounder units are linked to a central controller, which functions to control all of the sounder units as well as to maintain a user interface that provides a user with a display of the measured propagation characteristics of the region. Each sounder unit is capable of independently injecting RF stimulus signals with some desired radiation pattern into the region being measured, as well as recording received signals from which the RF propagation characteristics may be calculated. The central controller co-ordinates the set of sounder units to ensure that they act as a logical whole, and also enables propagation measurements to be made over long periods of time in order to capture time-varying characteristics of the indoor environment.

17 Claims, 22 Drawing Sheets

METHOD AND APPARATUS FOR MULTI-DIMENSIONAL CHANNEL SOUNDING AND RADIO FREQUENCY PROPAGATION MEASUREMENTS

CROSS-REFERENCE TO RELATED APPLICATIONS

The present invention claims priority from, and herein incorporates by reference, U.S. Provisional Patent Application Ser. No. 60/505,419 filed on Sep. 22, 2003.

FIELD OF THE INVENTION

The present invention generally relates to measurement of radio frequency propagation characteristics within a two or three-dimensional area, and, more specifically, to methods and apparatus for measuring and analyzing the radio frequency propagation characteristics of indoor environments for wireless data communication purposes.

BACKGROUND OF THE INVENTION

Wireless Local Area Networks (WLANs) have recently gained in popularity and importance. These networks are a special case of standard computer Local Area Networks (LANs), wherein the wires or optical fibers interconnecting computers have been partially or completely replaced by radio frequency (RF) data links operating at very high frequencies. WLANs may also be viewed as a special case of commonly encountered cellular telephone networks, where the relatively large distances (tens of miles) covered by cellular telephones have been significantly reduced (to hundreds of feet, in an indoor environment within buildings) in exchange for much higher data transmission rates. WLANs offer the possibility of interconnecting intra-building information technology devices such as computers, Personal Digital Assistants, printers, etc. at relatively high speeds without wires, and hence yield significant reductions in installation cost together with significant improvements in user convenience.

The design and installation of RF data links must factor in the propagation characteristics of the region covered by the data links. RF propagation characteristics of interest in indoor digital wireless communication systems include the following:

(a) Attenuation (loss) as a function of distance, including shadowing caused by reflecting or absorbing bodies in the environment; and
(b) Multipath (echoes) caused by reflection or diffraction from one or more scatterers in the environment, which can result in inter-symbol interference or variations in signal strength (fading).

WLANs are significantly affected by the propagation characteristics of the indoor environment in which they are used. This results from:

(a) Increased data rates. WLANs typically operate at data rates of 1 Mb/s or more for a given channel; modern WLAN technologies transfer data at speeds of up to 54 Mb/s. This means that the symbol periods used must be quite short, and consequently they are affected by inter-symbol interference resulting from multipath. In addition, the higher data rates require wider channels, which are more susceptible to effects such as frequency fading.
(b) Reduced transmit power limits. WLAN equipment is constrained to use unlicensed frequency bands with strict limits on radiated power, and as a result cannot overcome attenuation problems with increased transmit power.
(c) Strict cost and size constraints. As WLAN systems are intended to support mobile and portable applications in a home or business environment, it is not possible to deal with attenuation and multipath problems by utilizing large antenna arrays or complex networks of repeaters.

The increased usage and reliance upon WLANs has in turn required a much greater emphasis to be placed on measuring the propagation characteristics of RF energy in an indoor environment. Heretofore, most RF propagation studies and analyses have focused on propagation characteristics in an outdoor (urban or regional) environment, in response to the needs of broadcasting, cellular telephony, and other fixed and mobile wireless systems. The indoor environment in which WLANs are placed, however, exhibits different propagation characteristics and requires measurements to be made in different ways than the outdoor environment.

The indoor RF propagation environment poses a number of challenges. Firstly, the environment is quite complex, containing a large number of scatterers as well as a high density of absorbing elements with diverse physical characteristics. Secondly, the environment typically changes frequently, as objects are moved about. Finally, the relatively large density of transmitters and receivers present in a WLAN environment results in a large number of interactions.

Several approaches have been implemented to date to enable these issues to be dealt with when implementing indoor data networks. These are:

(a) Computer modeling of the propagation characteristics of the indoor space based on an exact representation of the dimensions and physical characteristics of the contents. This entails locating all of the objects present in a floor or building (walls, ceilings, furniture, etc.), creating a computer model of the entire space, and then using the model to predict the propagation characteristics of interest to WLAN designers. While this yields accurate results, it is complex, time-consuming and expensive.
(b) Extrapolation based on previous propagation studies. A large number of studies have been made of the propagation characteristics of various kinds of buildings, as well as of the physical characteristics of various types of building materials. It is possible to combine the results of these studies to produce a composite model or a set of composite models that can be applied to the building of interest. However, this approach can produce very inaccurate and unpredictable results because the geometry and contents of buildings vary widely, and RF propagation is greatly affected by small differences in layout and composition.
(c) Empirical deduction based on signal strengths. This consists of setting up an RF signal source at some location in a building and then measuring signal strengths at various points within the floor or building, and deducing the propagation characteristics based on the various measurements. However, this method is labor intensive, error prone, and frequently unrepeatable.
(d) Direct measurement of the propagation characteristics. An apparatus known as a channel sounder can be employed to directly measure the propagation characteristics of an RF channel. Channel sounders have been commonly employed in measuring the characteristics of point-to-point wireless links, but have also been utilized in the propagation studies previously referred to in order to measure the characteristics of buildings and materials. However, no means has been disclosed in the prior art of using this approach to perform propagation measurements of building spaces in two (or three) dimensions.

Accordingly, it is an object of the invention to provide an improved RF propagation measurement system for indoor environments. It is a further object of the invention to provide a propagation measurement system that enables measurements to be made over two-dimensional areas or regions. It is yet a further object of the invention to provide a propagation measurement system that allows the time-variant RF propagation characteristics of an indoor environment to be measured.

SUMMARY OF THE INVENTION

The invention provides for a distributed RF propagation measurement system for performing channel sounding in a two-dimensional space, comprising a plurality of independent sounder units, which are controlled by a user from a single central controller. In one preferred embodiment, each sounder unit contains: an antenna array and associated beamforming means for transmitting and receiving RF energy; channel sounder receiver and transmitter means; processing means for computing the propagation characteristics from the received RF energy; synchronization means for enabling multiple independent sounder units to function as a single distributed system; location determining means to measure the position of the sounder unit in three-dimensional space; communication means for transferring data and commands to and from the central controller; and control software means to control the functions of the sounder unit. The central controller is preferably implemented using software executed by a host computer, and performs user interface functions as well as communication and co-ordination of the sounder units.

The antenna array and beamforming means may preferably be operative to transmit and receive RF energy with well-defined directional characteristics, and may contain antenna means as well as means for phasing, gain control, power division and power combining (summing).

The channel sounder transmitter means may preferably be operative to generate RF stimulus signals that are transmitted into the environment.

The channel sounder receiver means may preferably be operative to process RF signals received from the environment and obtain power-delay profiles that are indicative of the characteristics of the RF propagation channel.

The location determining means may preferably be operative to measure the three-dimensional co-ordinates of the sounder unit relative to the central controller to a high degree of accuracy. The location determining means may use either the Global Positioning System (GPS) or an independent location determining capability that employs pseudolites to provide accurate spatial references from which three-dimensional vectors can be computed. The sounder units may communicate the location calculated by the location determining means to the central controller.

The communication means may preferably use a dedicated Ultra High Frequency (UHF) radio data link to communicate with the central controller.

The control software means may preferably be supported by an embedded controller or Central Processing Unit (CPU), and controls and co-ordinates the activities of the sounder unit.

Advantageously, the channel sounder transmitter and receiver means may be implemented using a sliding correlator function.

Advantageously, the synchronization means may employ clock synchronization signals derived from the location determining signals utilized by the location determining means.

BRIEF DESCRIPTION OF THE DRAWINGS

The description of the preferred embodiments is taken in conjunction with the accompanying drawings, wherein.

DETAILED DESCRIPTION

Figure 1:
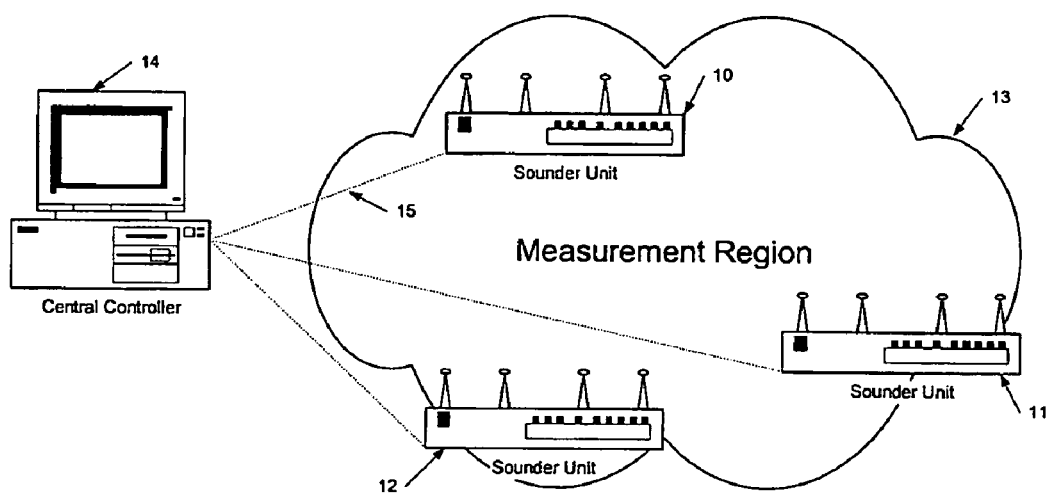
FIG. 1 is a diagram illustrating the general arrangement of the sounder units and the central controller in relation to the region over which RF propagation measurements are to be made.

With reference to FIG. 1, the two-dimensional channel sounder system comprises a general-purpose computer 14 that is programmed to act as a central controller, and a plurality of identical sounder units 10, 11, and 12 that perform the actual measurement of the RF propagation conditions within the region 13. As all of the sounder units 10, 11, 12 are preferably identical, it is understood that a reference to an aspect of any specific sounder unit, e.g. 10, shall be hereinafter taken to apply to all of the other sounder units in the system, e.g., 11, 12. It is further understood that the number of sounder units 10 in the system may range from 1 to any arbitrary number required to perform RF propagation measurements in the measurement region 13 to some predetermined level of accuracy. The level of accuracy increases as more sounder units 10 are placed in the measurement region 13, especially when measurement region 13 contains a large number of scatterers or other artefacts that affect RF propagation.

Each sounder unit 10 is a compact device that can be placed at various locations around or within the measurement region 13, and either generates RF stimulus energy within a specified frequency band into the measurement region 13, or receives and processes RF energy in the same frequency band from the latter. To measure propagation characteristics affecting WLAN communications, the frequency band selected is preferably centered at 2.4 gigahertz (GHz). However, it is understood that the apparatus and method described herein can be applied to propagation measurements performed for any desired RF band. In addition, to attain a spatial resolution of 1 meter (3 feet), which is suitable for measurements in an indoor region, a bandwidth of 300 megahertz (MHz) is preferably employed. However, it is understood that any desired spatial resolution may be attained by employing a different bandwidth, with the spatial resolution R being approximately equal to the speed of light c divided by the bandwidth B.

$$R=c/B \quad (1)$$

The central controller 14 communicates with each sounder unit 10 via communications links 15. The central controller 14 preferably utilizes a standard host computer or workstation, such as a personal computer, and performs user-interface, control, results processing and results display functions. A comprehensive control and analysis program may be implemented on the central controller 14 in order to control and co-ordinate the sounder units and analyze the data that they collect. User control of the sounder units is preferably accomplished through a Graphical User Interface (GUI), which performs user interface functions, including such elements as providing the user with access to propagation analysis tools and the ability to format and output reports based on data gathered by the sounder units and processed by the central controller.

Figure 2:
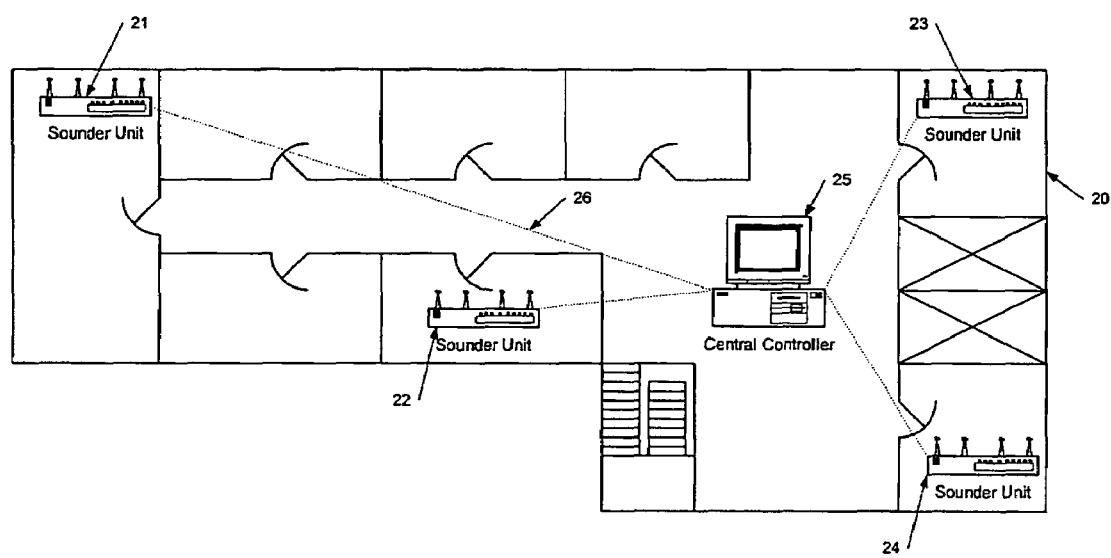
FIG. 2 is a further representation of a typical usage scenario of the two-dimensional channel sounder system within an example building or floor.

With reference to FIG. 2, an example of the usage of the system to determine the RF propagation characteristics of a particular floor 20 of a building or structure would consist of placing an appropriate number of sounder units 21, 22, 23, 24 at various locations within the floor 20 of the building, situating central controller 25 within the same floor at a location permitting communications with sounder units 21, 22, 23, 24 via communication links 26, and then making measurements of the propagation characteristics of the region enclosed by the sounder units 21, 22, 23, 24 within floor 20. Advantageously, the communication links 26 may be low-speed Ultra High Frequency (UHF) wireless data links, that eliminate the need for physical connections between sounder units 21, 22, 23, 24 but do not interfere with the propagation measurements being performed. A user of the system may then be enabled to make various propagation measurements on floor 20 by means of commands input to central controller 25; the results of these propagation measurements are preferably displayed by central controller 25. Sounder units 21, 22, 23, 24 may be re-positioned at various points within floor 20 and additional measurements performed if more precise results are required.

Figure 3:
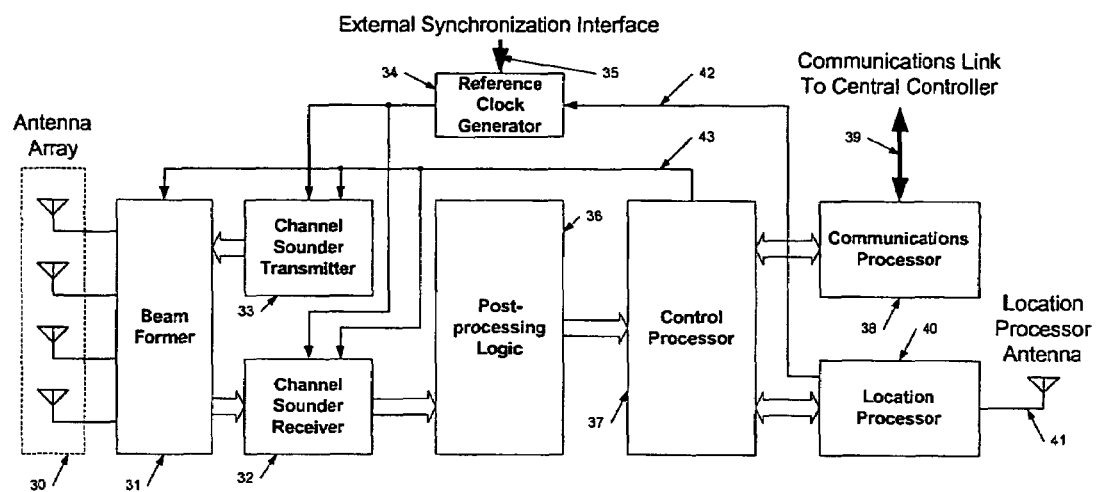
FIG. 3 is a schematic block diagram of the sounder unit.

With reference to FIG. 3, an embodiment of sounder unit 10 preferably comprises antenna array 30, which transmits and receives RF energy in a specific frequency band according to a predetermined radiation pattern; beamformer 31 coupled to antenna array 30 that shapes the radiation pattern of antenna array 30 to create a deep null (area of reduced RF radiation intensity) in a specific direction; channel sounder receiver 32 and channel sounder transmitter 33, both of which are operatively coupled to clock generator 34 that is preferably synchronized to the clock generators of other sounder units via clock synchronization signal 42 from location processor 40, and may also be synchronized using external synchronization interface 35; post-processing logic 36 that receives raw measured data from channel sounder receiver 32, processes it, and transfers the results to control processor 37; communications processor 38 that supports a communications link 39, which may advantageously be a UHF wireless data link, to the central controller; and location processor 40 coupled to location processor antenna 41 which serves to provide control processor 37 with accurate three-dimensional location information, as well as providing reference clock generator 34 with precise timing information via clock synchronization signal 42. Central controller 37 controls the operation of beamformer 31, channel sounder transmitter 33, and channel sounder receiver 32 using channel sounder control interface 43.

Figure 4:
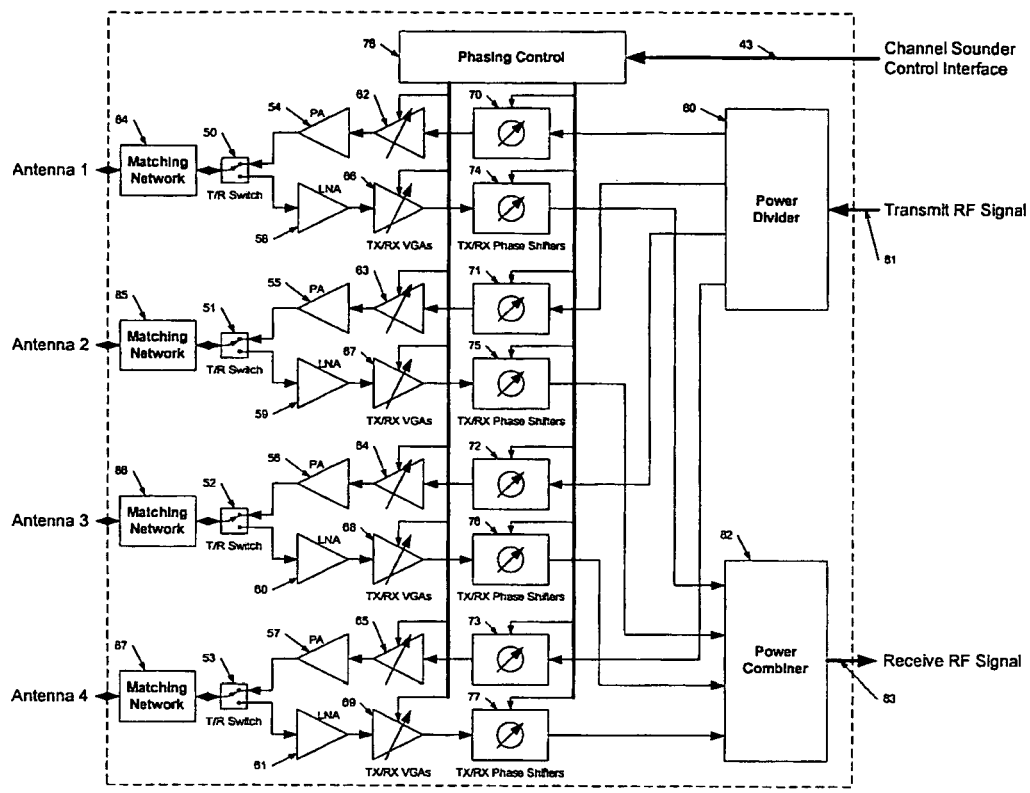
FIG. 4 is a schematic block diagram of the beamformer circuitry.

With reference to FIG. 4, beamformer 31 preferably comprises a set of transmit/receive switches 50, 51, 52, 53; a set of broadband RF power amplifiers 54, 55, 56, 57; a set of broadband RF low noise amplifiers 58, 59, 60, 61; a set of variable-gain RF amplifiers 62, 63, 64, 65, 66, 67, 68, 69, of which one subset 62, 63, 64, 65 is used for transmit signals and another subset 66, 67, 68, 69 is used for receive signals; a set of RF phase shifters 70, 71, 72, 73, 74, 75, 76, 77, of which one subset 70, 71, 72, 73 is used for transmit signals and another subset 74, 75, 76, 77 is used for receive signals; phasing control block 78, which controls the gain of variable-gain RF amplifiers 62, 63, 64, 65, 66, 67, 68, 69 and the phase lag or lead of phase shifters 70, 71, 72, 73, 74, 75, 76, 77; power divider 80, which accepts transmitted signal power on transmit RF signal 81 and divides it uniformly among the transmit phase shifters 70, 71, 72, 73; and a power combiner 82 that accepts receive RF power from receive phase shifters 74, 75, 76, 77 and sums it to produce the final received signal output on receive RF signal 83. Preferably, beamformer 31 may further contain a set of broadband matching networks 84, 85, 86, 87 that serve to match impedances between the RF power amplifiers 54, 55, 56, 57 and antenna array 30. Preferred embodiments of the present invention may use switched matching network circuits for broadband matching networks 84, 85, 86, and 87. Such matching network circuits are well known in the prior art and will not be described further.

Figure 6:
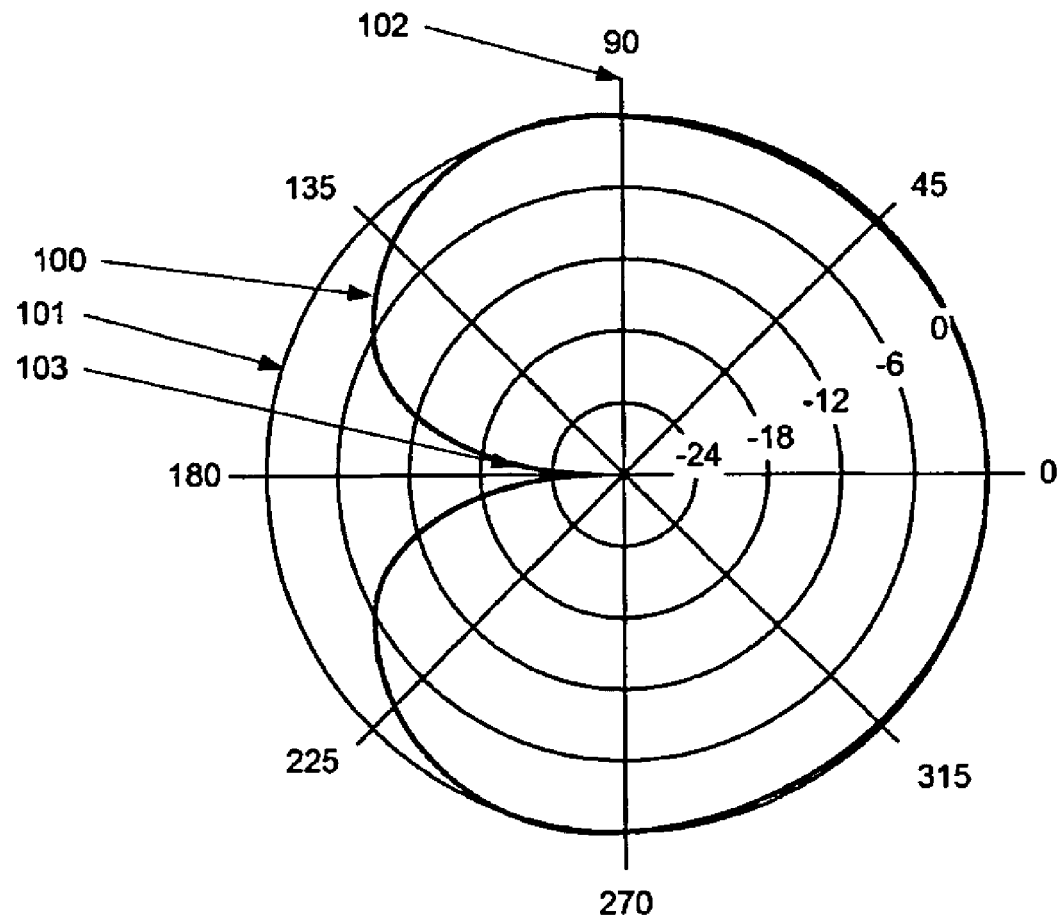
FIG. 6 is a representation of the radiation pattern (in the azimuthal direction) produced by the antenna array of FIG. 5.

The function of beamformer 31 is to control the relative phases and amplitudes of the transmitted RF signals driven to antenna array 30, as well as to control the relative phases and amplitudes of the RF signals received from antenna array 30, under control of control processor 37 via channel sounder control interface 43. It is well known in the prior art that controlling amplitudes and phases in this manner enables antenna array 30 to exhibit various types of radiation patterns. An example of a radiation pattern obtained by this process is depicted in FIG. 6, and is described in detail in the accompanying text.

Beamformer 31 depicted in FIG. 4 represents a four-channel beamformer circuit, comprising four identical sets of phase shifting, amplification, matching and switching units operatively coupled to four identical ports on power divider 80 and power combiner 82. It is understood, however, that the beamformer 31 can be extended to any arbitrary number of channels by increasing or decreasing the number of sets of phase shifting, amplification, matching and switching units as well as the number of ports on the power divider and power combiner.

Figure 5:
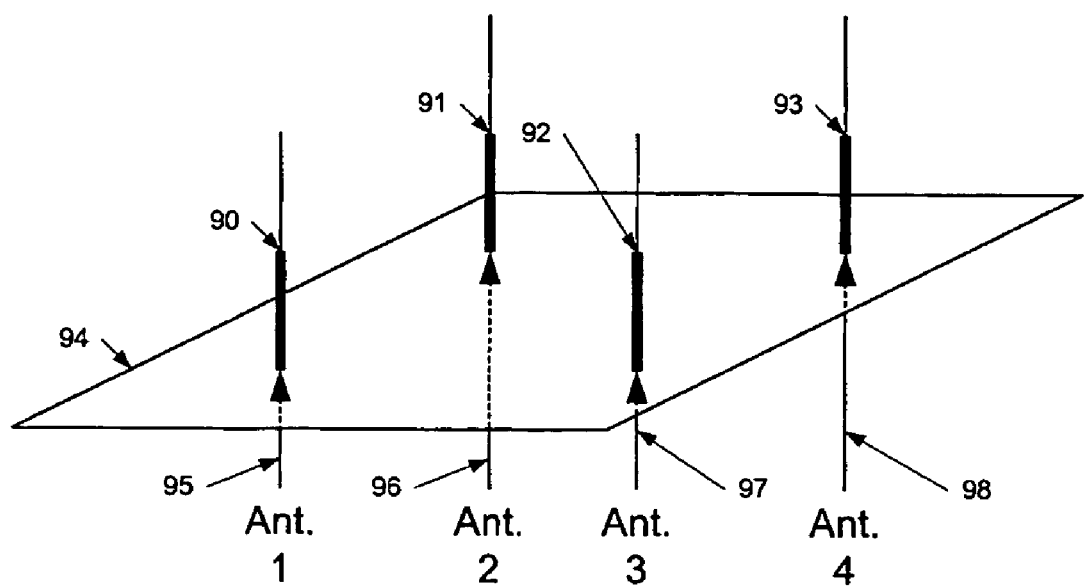
FIG. 5 is a depiction of the mechanical arrangement of an antenna array used in accordance with one preferred embodiment of the sounder unit.

With reference to FIG. 5, antenna array 30 may comprise a set of vertical radiators 90, 91, 92, 93 preferably mounted at the corners of a square on a flat conducting ground plane 94. The spacing between vertical radiators 90 and 91, 91 and 92, 92 and 93, 91 and 93 is preferably set to one-quarter of a wavelength at the frequency band of operation. For example, for WLAN propagation measurements in the 2.4 GHz frequency band, this is 31.25 mm. The vertical radiators are fed from the outputs of transmit/receive switches 50, 51, 52, and 53 in beamformer 31 by means of coaxial cables 95, 96, 97, and 98. For example, the interconnection of transmit/receive switches 50, 51, 52, 53 to coaxial cables 95, 96, 97, 98 may be performed as follows: 50 to 95, 51 to 96, 52 to 97, 53 to 98.

Each of the vertical radiators 90, 91, 92, 93 may hence be driven with independent phases and amplitudes with respect to the transmit RF input 81 to beamformer 31 during transmission of RF energy. In addition, RF energy received by each of the vertical radiators 90, 91, 92, 93 may be combined with different phase and amplitude relationships to generate a single receive RF output 83 from beamformer 31.

With reference to FIG. 6, radiation pattern 100 generated by the antenna array 30 as plotted on azimuth plot 101 may be controlled by beamformer 31 to preferably produce a cardioid type of radiation pattern with a single deep null 103. The direction of null 103 may be steered (rotated in azimuth) by adjusting the phase and amplitude relationships using phasing control 78 of beamformer 31. The process of calculating the phase and amplitude adjustments in order to steer the direction of null 103 is well known in the prior art and will not be described further.

Figure 7:
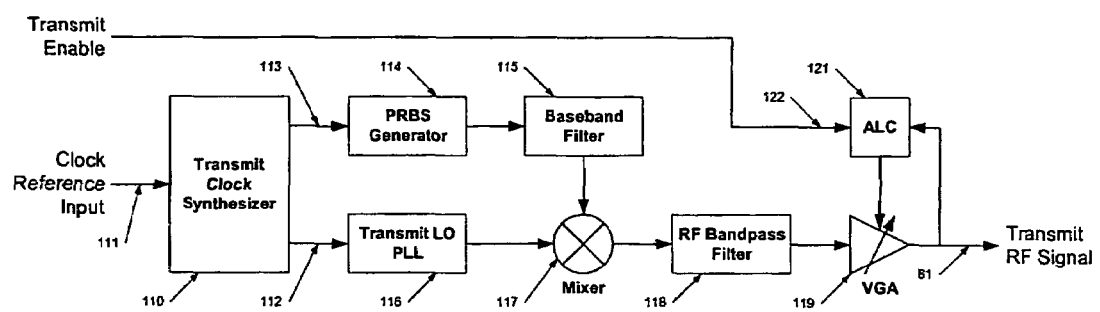
FIG. 7 is a schematic block diagram of the circuitry for the channel sounder transmitter.

With reference to FIG. 7, channel sounder transmitter 33 preferably comprises transmit clock synthesizer 110, transmit local oscillator (LO) Phase Locked Loop (PLL) 116, Pseudo Random Bit Sequence generator (PRBS) 114, baseband filter 115, mixer 117, RF bandpass filter 118, variable-gain amplifier (VGA) 119, and Automatic Level Control (ALC) circuitry 121.

Transmit clock synthesizer 110 accepts a stable clock reference input 111, which is preferably at a frequency of 10 MHz, and multiplies its frequency to generate two output reference clock signals 112 and 113. Clock reference signal 112 is preferably at a frequency of 100 MHz, and clock reference signal 113 is preferably at a frequency of 300 MHz. Clock reference signal 113 is used by PRBS generator 114 to generate a continuous, repeating maximal-length pseudo-random bit sequence, preferably of length 2047, which is input to baseband filter 115. Baseband filter 115 preferably performs a low-pass filter function upon the pseudo-random bit sequence to produce a modulation signal of the desired bandwidth; in the preferred embodiments of the present invention, this bandwidth is set to 300 MHz.

Transmit LO PLL 116 multiplies clock reference signal 112 to generate a stable local oscillator signal with low phase noise. In one preferred embodiment, the local oscillator signal is at a frequency of 2,450 MHz, enabling sounder unit 10 to perform propagation measurements in the 2,300 MHz to 2,600 MHz frequency band. In another preferred embodiment, the local oscillator signal is switchable between a frequency of 5,250 MHz and a frequency of 5,775 MHz, enabling sounder unit 10 to perform propagation measurements in the 5,100 to 5,400 and 5,625 to 5,925 MHz frequency bands respectively.

The outputs of baseband filter 115 and transmit LO PLL 116 are input to mixer 117. Mixer 117 mixes (multiplicatively combines) these two signals to produce an RF signal of bandwidth set by baseband filter 115 and centered on the center frequency set by transmit LO PLL 116. The output of mixer 117 is coupled to RF bandpass filter 118, which may filter the RF signal to shape its frequency characteristics and eliminate unwanted mixing products.

In the preferred embodiments, the output of RF bandpass filter 118 is passed to VGA 119, which is operatively coupled to ALC circuit 121. VGA 119 amplifies the RF signal produced by RF bandpass filter 118 and passes it to the transmit RF signal 81 of channel sounder transmitter 33. ALC circuit 121 detects the output level of transmit RF signal 81, and preferably controls the gain of VGA 119 to ensure that this output level remains constant regardless of the voltage levels of the outputs of baseband filter 115 and transmit LO PLL 116.

Figure 8:
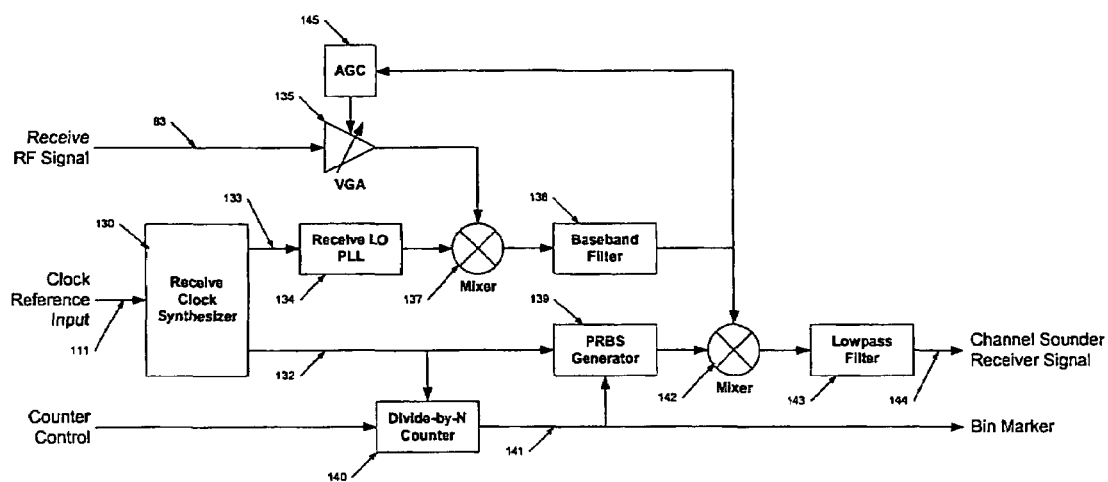
FIG. 8 is a schematic block diagram of the circuitry for the channel sounder receiver.

With reference to FIG. 8, channel sounder receiver 32 preferably comprises receive clock synthesizer 130, receive LO PLL 134, VGA 135, AGC circuit 145, baseband filter 138, PRBS generator 139, divide-by-N counter 140, mixer 142, and lowpass filter 143.

Receive clock synthesizer 130 accepts a stable clock reference input 111, which is preferably at a frequency of 10 MHz, and multiplies its frequency to generate two output clock signals 132 and 133. In the preferred embodiments, clock signal 132 is at a frequency of 300 MHz and drives PRBS generator 139, and clock signal 133 is at a frequency of 100 MHz and is used as an input reference by receive LO PLL 134. The frequency and phase of clock signals 132 and 133 in channel sounder receiver 32 are preferably very nearly identical to those of clock signals 112 and 113 respectively in channel sounder transmitter 31 in all channel sounder units 10, 11, 12, to enable any of channel sounder units 10, 11, 12 to detect and demodulate the transmitted signal generated by any other of channel sounder units 10, 11, 12. This may be done by ensuring that clock reference input 111 to receive clock synthesizer 130 in any of channel sounder units 10, 11, 12 is frequency and phase coherent with clock reference inputs 111 to transmit clock synthesizers 110 in all other channel sounder units 10, 11, 12.

Receive LO PLL 134 multiplies clock reference input 111 to generate a stable local oscillator signal with low phase noise. In one preferred embodiment, the local oscillator signal is at a frequency of 2,450 MHz, enabling sounder unit 10 to perform propagation measurements in the 2,300 MHz to 2,600 MHz frequency band. In another preferred embodiment, the local oscillator signal is switchable between a frequency of 5,250 MHz and a frequency of 5,775 MHz, enabling sounder unit 10 to perform propagation measurements in the 5,100 to 5,400 and 5,625 to 5,925 MHz frequency bands respectively.

In the preferred embodiments, VGA 135 accepts receive RF signal 83 to channel sounder receiver 32 and amplifies the signal prior to passing it to mixer 137. Mixer 137 mixes the amplified RF input signal with the local oscillator signal produced by receive LO PLL 134, generating a baseband signal that is preferably low-pass filtered by baseband filter 138 to remove unwanted mixing products from mixer 137. Baseband filter 138 may further ensure that the bandwidth of the baseband signal is limited to that of the frequency band of interest, preferably the same as the frequency band occupied by the RF signal generated by channel sounder transmitter 33. Preferably, AGC circuit 145 is operatively coupled to VGA 135 and baseband filter 138, and may adjust the gain of VGA 135 to ensure that the level of the output signal from baseband filter 138 maintains a constant average level to avoid overdriving mixer 142.

PRBS generator 139 may accept clock input 132 and use it to generate a maximal-length pseudo-random bit sequence, preferably of identical length and value to that generated by PRBS generator 114 in channel sounder transmitter 33. PRBS generator 139 is coupled to mixer 142, which mixes (multiplies) the baseband signal from baseband filter 138 and the PRBS from PRBS generator 139. This multiplication function is equivalent to a correlation performed between the incoming baseband signal and the locally generated PRBS; hence mixer 142 produces a high output level when the baseband signal matches the PRBS and a low output level when the baseband signal does not match the PRBS. The output of mixer 142 is preferably passed to lowpass filter 143, which may filter out the higher-order components of the signal, leaving the lower frequency correlation products that are output to channel sounder receiver signal 144. The bandwidth of the lowpass filter is preferably set to the frequency of clock signal 132 supplied to PRBS generator 139, divided by the length of the PRBS sequence. For example, with a frequency of 300 MHz for clock signal 132 and a PRBS length of 2047, the bandwidth of lowpass filter 143 may be set to 146.6 kilohertz (kHz).

In the preferred embodiments, the locally generated PRBS may be progressively delayed with respect to the received baseband signal in order to sweep the correlation function being performed over the received baseband signal. This is preferably done by inserting a 1-bit delay into the PRBS sequence (i.e., preventing PRBS generator 139 from producing the next bit of the sequence until 1 extra bit time has elapsed) at regular intervals. The rate of the sweep may be controlled by divide-by-N counter 140, which may be configured by control processor 37 to divide clock signal 132 by a specific ratio, such that a 1-clock pulse is produced on bin marker signal 141. The pulse on bin marker signal 141 in turn causes PRBS generator 139 to freeze its internal state for the duration of bin marker signal 141, thus causing the PRBS output by PRBS generator 139 to be delayed by one clock.

It is apparent that shifting the output of PRBS generator 139 by 1 clock cycle at periodic intervals results in progressively shifting the PRBS relative to the received baseband signal from baseband filter 138, such that the correlation is performed with a delay increasing in steps of one clock cycle on clock signal 132. The effect is to divide the correlation into bins, with each bin being of a constant width and having a different (progressively increasing) delay. The start of each bin is marked by the pulse on bin marker signal 141, which may be used by post-processing logic 36 to determine the boundaries of each bin.

Figure 9:
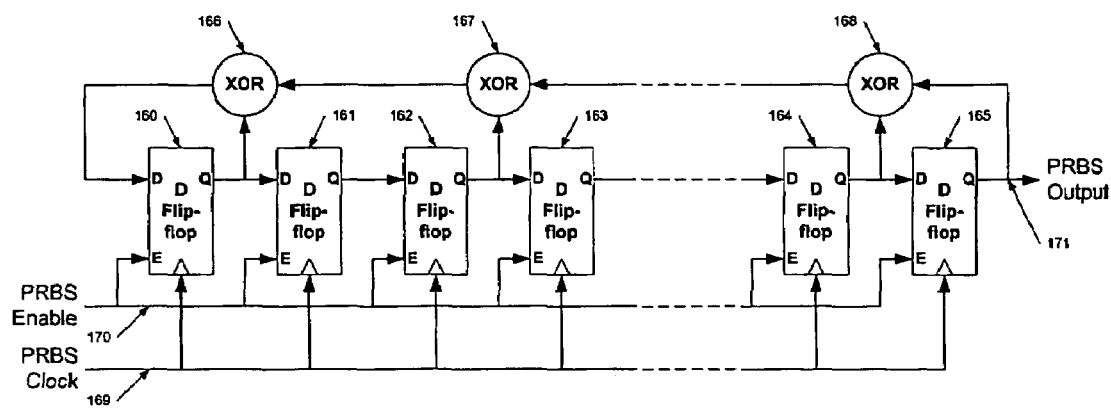
FIG. 9 is a schematic block diagram of the circuitry for the pseudo-random bit sequence generator.

With reference to FIG. 9, PRBS generator 114 in channel sounder transmitter 33 and PRBS generator 139 in channel sounder receiver 32 may be implemented in the form of a Linear Feedback Shift Register (LFSR) using a set of D flip-flops and exclusive-OR (XOR) gates. For a PRBS of length (N−1), where N is a power of 2, a total of $\log_2(N)$ D flip-flops are required, all connected in series to form a standard shift register. Further, for a PRBS generating polynomial having k terms, where k is less than $\log_2(N)$, a total of k XOR gates are required, each XOR gate being connected at a tap point on the shift register of D flip-flops corresponding to the power of the corresponding polynomial term. FIG. 9 shows an example of a PRBS generator with D flip-flops being represented by 160, 161, 162, 163, 164, 165 and XOR gates by 166, 167, 168, with additional D flip-flops being connected in between 163 and 164. It is understood that this representation may be extended to cover generating polynomials of any arbitrary size and complexity by adding more D flip-flops and XOR gates. It is further understood that such a structure may be implemented in both serial and parallel forms. The architecture and implementation of PRBS generators is well known in the prior art and will not be described further.

Figure 10:
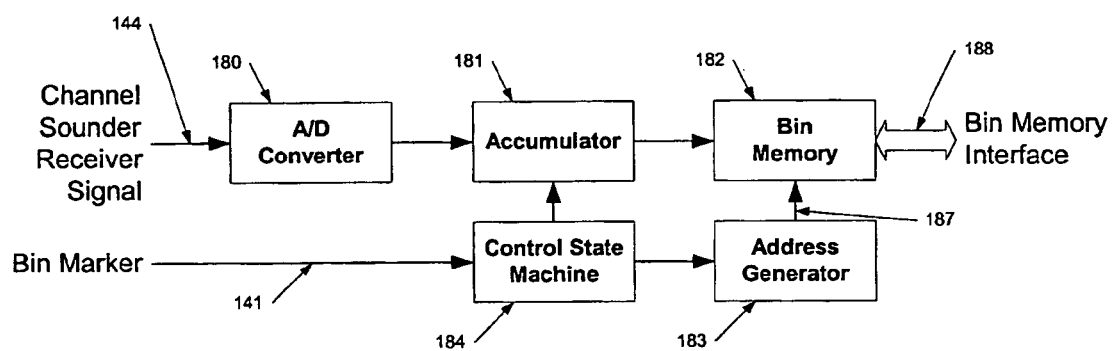
FIG. 10 is a schematic block diagram of the circuitry for the post-processing logic.

With reference to FIG. 10, post-processing logic 36 preferably comprises Analog-to-Digital (A/D) converter 180, digital accumulator 181, bin memory 182, memory address generator 183 and control state machine 184. A/D converter 180 accepts analog input from channel sounder receiver 32 on channel sounder receiver signal 144 and converts it to digital, with output in the form of a periodic sequence of digital words. The sampling rate of A/D converter 180 is preferably set to at least twice the bandwidth of lowpass filter 143 in channel sounder receiver 32, and the reference signal used by A/D converter 180 is controlled by AGC circuit 145 to scale the digital output in accordance with the AGC voltage. The sequence of digital words is passed to accumulator 181, which may accumulate (add) all of the digital samples within a given bin delineated by bin marker signal 141. The accumulated result is then passed to bin memory 182 for storage in the memory address corresponding to the appropriate bin, as indicated by address generator 183. Control state machine 184 controls the operation of accumulator 181 and address generator 183 according to the signal on bin marker 141. Control processor 37 is enabled to read the data out of bin memory 182 via bin memory interface 188.

In accordance with a preferred embodiment of the present invention, the operation of post-processing logic 36 is as follows. When a pulse is received on bin marker 141, address generator 183 is caused to step to the next sequential memory address (corresponding to the next sequential bin), and accumulator 181 is cleared to zero. Subsequently, A/D converter 180 converts channel sounder receiver signal 144 to a sequence of digital words that may be accumulated into accumulator 181. When the next pulse is received on bin marker 141, the accumulated value in accumulator 181 may be written to bin memory 182 at the indicated address, and the cycle repeats. The number of cycles is N, where (N−1) is the length of the PRBS generated by PRBS generator 114 in channel sounder transmitter 33 and PRBS generator 139 in channel sounder receiver 32. At the end of the process, bin memory 182 will contain N accumulated values, each value corresponding to a shifted correlation of PRBS generator 139 in channel sounder receiver 32 with receive RF signal 83.

The values present in bin memory 182, when arranged in increasing sequence of delay from 0 to (N−1), correspond to the power-delay profile of the RF propagation channel being measured by channel sounder unit 10 at that point in time. An example of a power-delay profile is provided in FIG. 16 and described in the accompanying text. The present invention may use a large number of such power-delay profiles, obtained from all of channel sounder units 10, 11, 12 with different orientations for deep null 103 in antenna radiation pattern 100 on each channel sounder unit 10, 11, 12, to compute the two-dimensional RF propagation characteristics of the indoor region in which the channel sounder units 10, 11, 12 are located.

Figure 11:
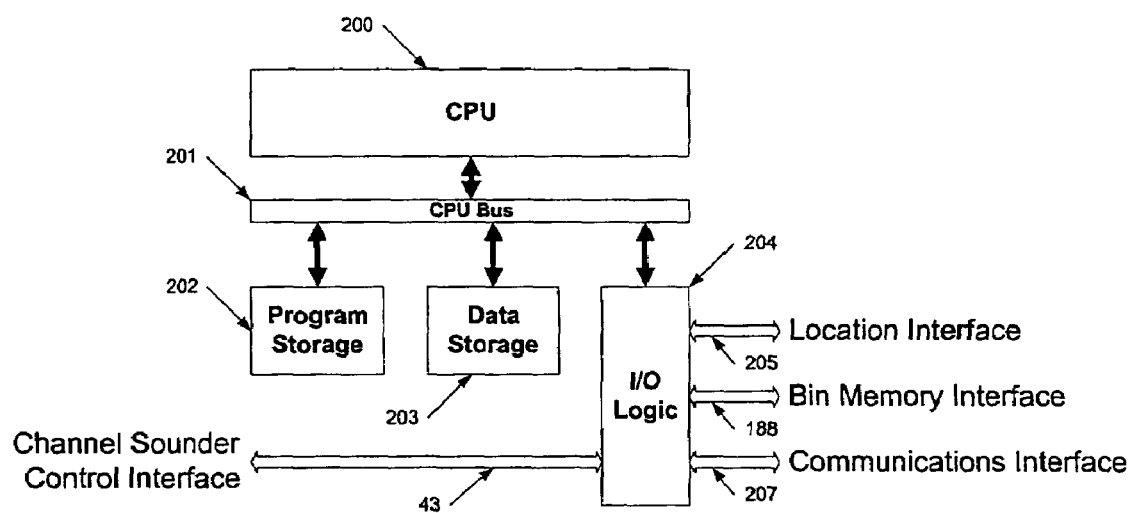
FIG. 11 is a schematic block diagram of the circuitry for the control processor.

With reference to FIG. 11, control processor 37 preferably comprises CPU 200, which is operatively coupled to bus control logic 201 that is in turn coupled to program storage 202, data storage 203, and I/O logic 204. I/O logic 204 couples to location processor 40 using location interface 205; to bin memory 182 using bin memory interface 188; to communications processor 38 using communications interface 207; and to beamformer 31, channel sounder receiver 32, and channel sounder transmitter 33 using channel sounder control interface 43.

CPU 200 may exercise overall control and co-ordination of location processor 40, beamformer 31, channel sounder receiver 32, and channel sounder transmitter 33; maintain communication links 15 to central controller 14 via communications processor 38 (preferably supporting a TCP/IP protocol stack in order to simplify the communications functions); and communicate with the central controller 14 to perform test set-up and report test results. The CPU 30 may also implement firmware programs required for performing RF propagation measurement functions.

A communications link is required between the sounder unit 10 and the central controller 14 in order for the central controller 14 to configure and control sounder unit 10 and also to receive test results. This communications link may preferably be implemented using a dedicated UHF radio link. The communications link is supported by implementing one instance of communications processor 38 in each sounder unit 10, and one similar instance of communications processor 38 in central controller 14. Central controller 14 may advantageously implement a polling or time-division-multiplexing protocol to allow communications with all of sounder units 10, 11, 12 without requiring multiple instances of communications processor 38 to be present at the central controller 14. The realization of such polling or time-division-multiplexing protocols in radio links is well understood and will not be described further.

Figure 12:
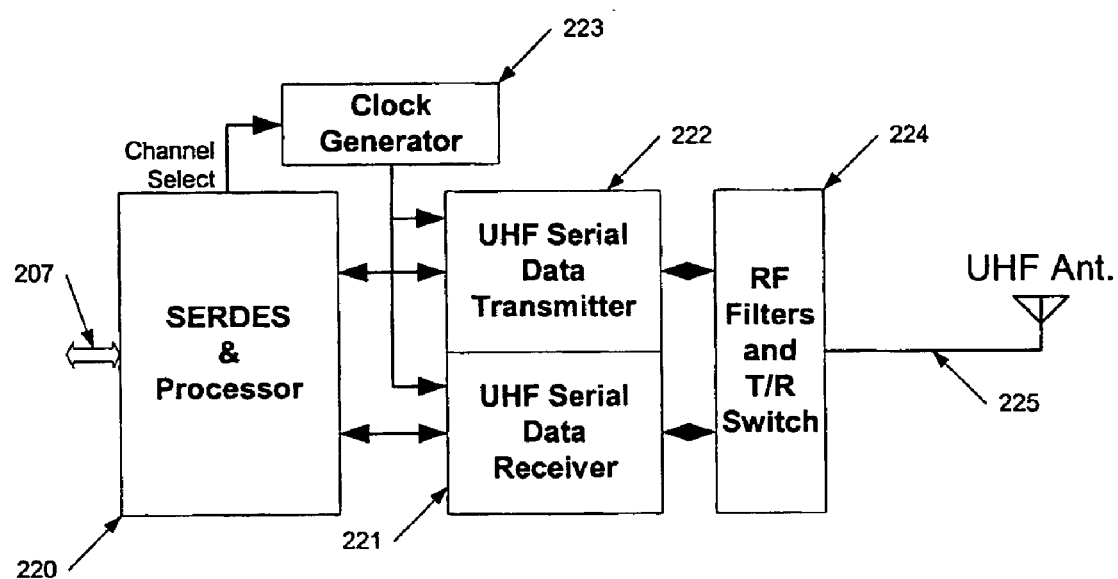
FIG. 12 is a schematic block diagram of the circuitry for the communications processor that serves as the control link to the central controller.

With reference to FIG. 12, communications processor 38 may be implemented using a dedicated UHF radio data link operating in a suitable frequency band, preferably 430 MHz. The dedicated UHF-radio data link comprises UHF antenna 225 coupled to RF filters and transmit/receive switch 224, which is in turn coupled to UHF serial data transmitter 222 and UHF serial data receiver 221. Serializer/deserializer (SERDES) and data processor 220 converts between parallel data transferred to or from CPU 200 via communications interface 207, and serial data streams that are generated by UHF serial data receiver 221 and accepted by UHF serial data transmitter 222. Clock generator 223 implements a clock synthesis function that generates the necessary bit-clock, carrier and frequency conversion signals required by UHF serial data transmitter 222 and UHF serial data receiver 221. Multiple UHF channels may be supported by reconfiguring clock generator 223 to generate different carrier frequencies.

Figure 13:
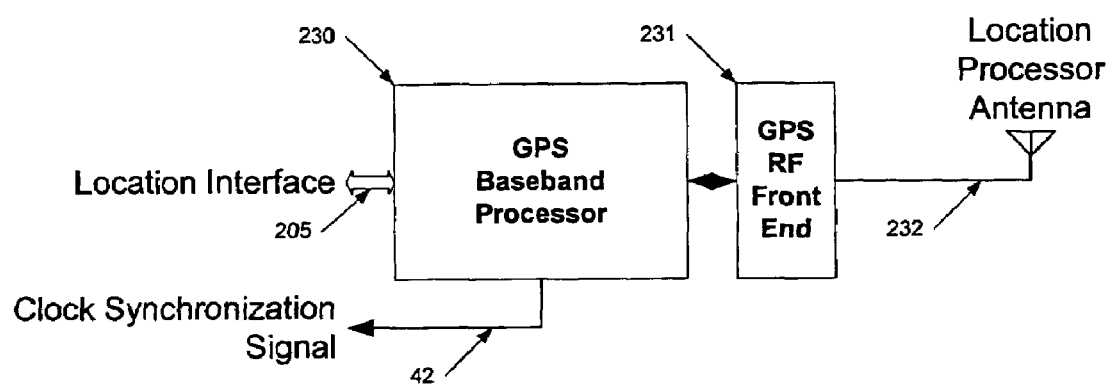
FIG. 13 is a schematic block diagram of the circuitry for the location processor.

With reference to FIG. 13, location processor 40 may be advantageously implemented using the Global Positioning System (GPS) to determine the absolute three-dimensional spatial co-ordinates of sounder unit 10, and subsequently computing the three-dimensional vector from the sounder unit 10 to the central controller 14 in order to ascertain the relative position of sounder unit 10. Location processor 40 consists of GPS RF front end unit 231, operatively coupled to location processor antenna 232, and GPS baseband processor 230. Standard GPS processing is performed on the GPS satellite navigation signals received by location processor antenna 232 to compute the three-dimensional co-ordinates of sounder unit 10, which are passed to control processor 37 via location interface 205. In addition, location processor 40 may preferably generate clock synchronization signal 42 derived from the GPS radio signal received by location processor antenna 232 for use by reference clock generator 34 to generate a 10 MHz clock reference 111.

Figure 14:
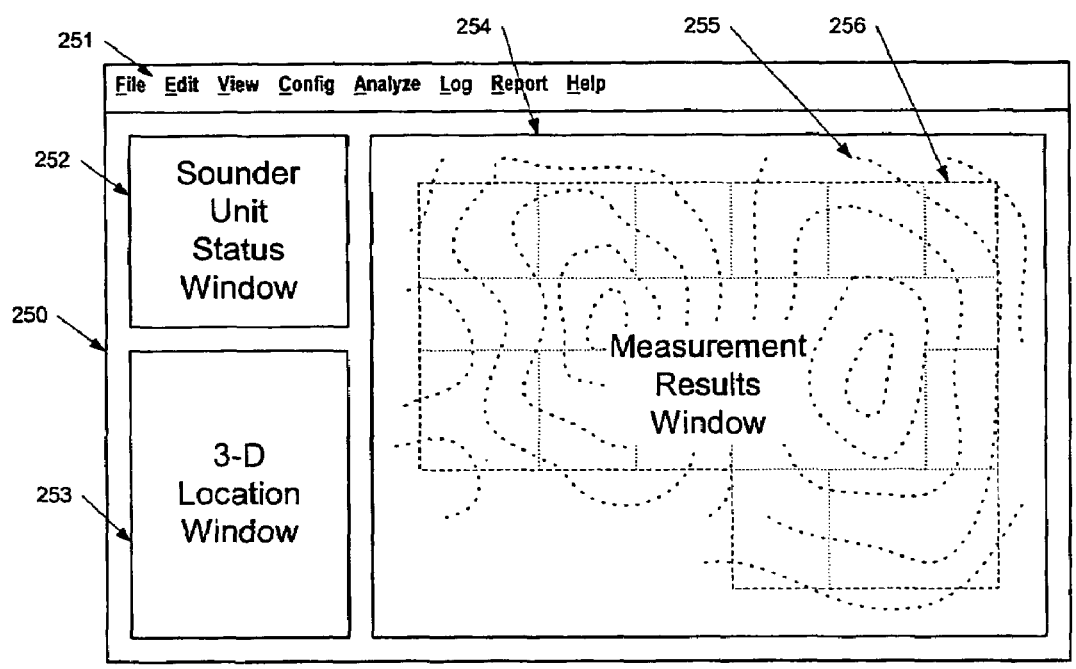
FIG. 14 is a representation of an example of a Graphical User Interface which may be employed by the central controller for presenting the measured propagation characteristics of a region to a user.

With reference to FIG. 14, the software program executed by central controller 14 displays and maintains a Graphical User Interface (GUI) 250 that interacts with the user of the two-dimensional channel sounder system and controls the operation of sounder units 10, 11, 12 through communication links 15, together with an associated underlying control program supporting GUI 250. The specific capabilities of GUI 250 and its associated control program preferably include:

(a) Detection, initialization and configuration of sounder units;

(b) Display of sounder unit status;

(c) Configuration of propagation measurement parameters;

(d) Display of sounder unit location in a 3-D window;

(e) Display of measured propagation characteristics as charts and contour maps;

(f) Saving and restoring of charts and sounder unit log files; and (g) Download and update of firmware on the sounder units.

GUI 250 and its associated control program may advantageously enable the user to download firmware images stored on the central controller to sounder units 10, 11, 12 thereby allowing the sounder units to be upgraded in capabilities and features in the field. GUI 250 display preferably consists of menu bar 251 that displays menus of commonly used commands; sounder unit status window 252 that shows the current operational status of a plurality of sounder units 10 available to the user for the test; 3-D view window 253 that may display a three-dimensional view (as a 2-D projection) of the set of sounder units, preferably superimposed upon a floorplan or architectural projection of the building in which propagation is being measured; and measurement results window 254 that displays the results of the propagation measurements performed by sounder units 10 under command by the user.

Measurement results window 254 may preferably interpret and display the results of the propagation measurements as contours 255. Contours 255 may represent RF propagation characteristics (for example, attenuation) or predicted traffic characteristics (for example, bit error rate for a specific transmitted power). Contours 255 may further be superimposed upon a floorplan 256 of the building or region in which measurements are being made. In the case of a three dimensional view, contours 255 may represent a projection of RF propagation characteristics or predicted traffic characteristics upon floorplan 256 representing a particular floor or area.

User interactions with GUI 250 are translated by the underlying control program into sets of instructions that are transferred to sounder units 10 via communications links 15. Each set of instructions is executed by control processor 37 in the corresponding sounder unit 10 in order to perform a specific measurement or test. The results are returned to GUI 250 via communications links 15 and subsequently displayed in measurement result window 254 of GUI 250.

It is understood that various modifications of GUI 250, in particular relating to the representation of the measurement results as tables, lists, charts or graphs, will be apparent to those skilled in the art upon reference to this description.

Operation of the RF propagation measurement system depicted in FIG. 1 is completely initiated and controlled via GUI 250 running on the host computer serving as central controller 14. GUI 250 converts operator commands that are input via a keyboard and/or mouse into high-level command messages directed at one or more of the sounder units 10, 11, 12; these command messages are then passed to the specified sounder units via the appropriate communications links 15. System operation preferably begins with an initialization phase, followed by the actual measurement execution phase. Post-processing and report generation may then follow the measurement phase, after the results of the measurements have been gathered by GUI 250 from the sounder units.

Figure 15:
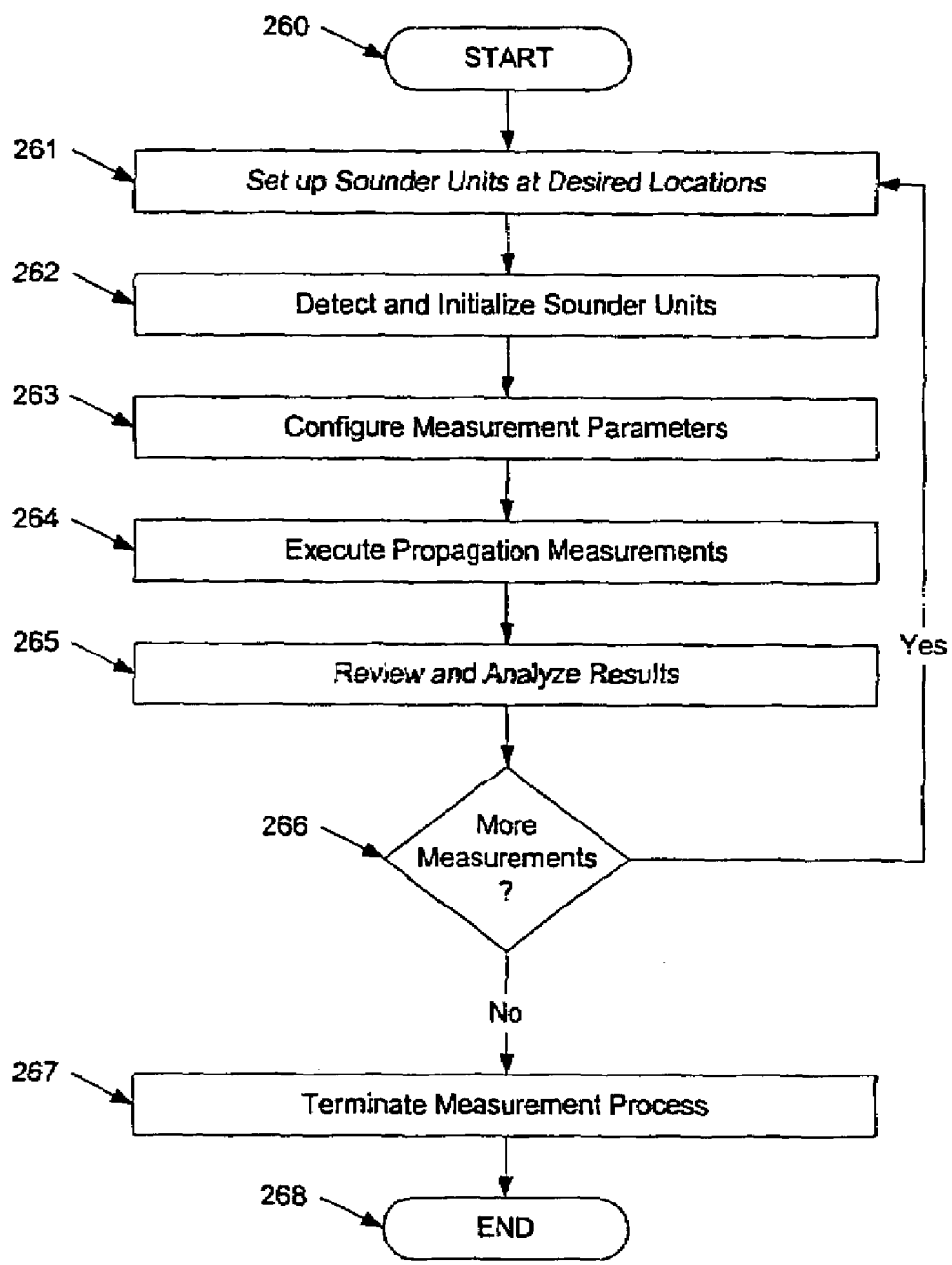
FIG. 15 depicts the process of setting up, initializing, configuring and operating the sounder units and analyzing the results.

With reference to FIG. 15, a typical usage scenario may include the steps of:

(a) At step 261, setting up the sounder units 10, 11, and 12 at the desired locations around the region for which RF propagation characteristics are to be measured, and powering them on;

(b) At step 262, starting up GUI 250 on central controller 14 to display the top-level screen, search for and detect sounder units 10, 11, 12, and ensure that the required sounder units 10, 11, 12 have been detected and initialized;

(c) At step 263, configuring parameters, if necessary, for the RF propagation measurement to be performed by the set of sounder units 10, 11, 12;

(d) At step 264, executing the propagation measurements on sounder units 10, 11, 12;

(e) At step 265, reviewing the data captured by sounder units 10, 11, and 12, processed by central controller 14, and presented on measurement results window 254. Sounder unit status window 252 may also be reviewed in order to ascertain whether the system is functioning properly, and 3-D location window 253 may be inspected to determine if the sounder units have been properly placed. Step 265 may further comprise the step of invoking post-processing analysis and report generation functions on the measured data; and (f) At step 266, checking to see if more measurements need to be made; if not, at step 267 terminating the test procedure by exiting GUI 250 and powering down the sounder units 10, 11, 12; otherwise, returning to step 261 to perform additional measurements.

Initialization of the wireless data communication protocol test system at step 112 takes place immediately after GUI 250 is started, may include three stages: sounder unit polling and discovery, timing synchronization, and sounder unit location. The system initialization process preferably happens automatically (when GUI 250 is started); however, it may also be initiated and controlled by the user via GUI 250. Also, the initialization phase may advantageously include firmware upgrades to the sounder units 10, 11, 12, 13 under user control.

The first stage in the initialization process preferably includes polling for and discovering all of the sounder units that are available. The set of sounder units thus found is reported to the user, who may then be allowed to modify the set by removing or reassigning sounder units that are not intended to participate in the subsequent measurements. The process of polling for sounder units may advantageously occur at regular intervals while GUI 250 is running, in order to detect when new sounder units have been added to the system, or to detect if an existing sounder unit has been removed or has failed during a test.

The initialization process preferably then ensures that reference clock generators 34 within each of the sounder units 10, 11, 12 are synchronized to each other. Synchronization may be performed within each sounder unit utilizing either clock synchronization signal 42 or external synchronization interface 35. After synchronization has been performed, the final stage of initialization preferably includes obtaining the precise three-dimensional location of each of the sounder units by means of location processor 40. Central controller 14 may poll for the three-dimensional coordinates of each sounder unit, and report the results to the user via 3-D location window 253. The central controller 14 may advantageously improve location accuracy by transmitting differential GPS (DGPS) corrections to the sounder units at this time, if DGPS information is available.

Subsequent to initialization 262, each sounder unit 10 is preferably configured from central controller 14 prior to running tests, as shown in step 263. Configuration may preferably include the steps of selecting one or more frequency bands in which measurements are to be made, configuring PRBS patterns and transmit power levels to be used, selecting antenna pattern characteristics to be used, configuring measurement periods and repetition rates, and defining reporting options for measurement results to be sent back to central controller 14.

During the actual RF propagation measurement process, the channel sounder transmitter 33 in any one sounder unit 10 is activated to transmit RF energy by means of antenna array 30. At the same time, a plurality of other sounder units, for example 11, 12, may have their channel sounder transmitters 33 disabled and their channel sounder receivers 32 and post-processing logic 36 activated to receive, demodulate, correlate and accumulate data from the RF energy received by their antenna arrays 30. Data thus received and processed by the post-processing logic into bins representing elements of power-delay profiles are passed to the respective control processors in the receiving sounder units. These power-delay profiles are further processed and the resulting data is passed to central controller 14 via communications link 39 for final processing and presentation of results.

Figure 16:
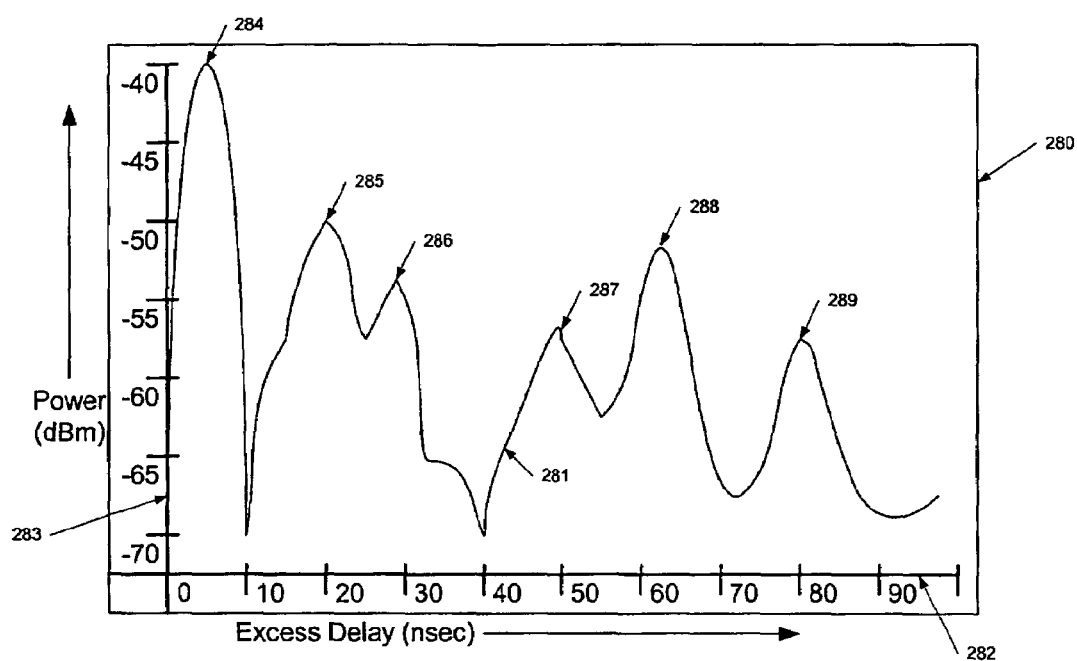
FIG. 16 is a representation of an example power-delay profile obtained by the sounder unit.

With reference to FIG. 16, an example of a power-delay profile measured by a sounder unit is represented in graphical form 280. It is understood that this is a representation of the power-delay profile for purposes of description, and the actual power-delay profile comprises vectors of amplitude values stored in bin memory 182 in post-processing logic 36.

The horizontal axis 282 represents an increasing excess delay in the propagation path between a transmitting sounder unit, for example 10, and a receiving sounder unit, for example 11. This excess delay arises as a consequence of RF energy being scattered from one or more scatterers in the region being measured, and corresponds to addresses in bin memory 182 in post-processing logic 36, with an increasing excess delay corresponding to an increasing address. The vertical axis 283 represents an increasing power level for received RF energy. The power-delay profile is plotted as curve 281 corresponding to values stored in bin memory 182 as a function of address (i.e., excess delay).

The representation of the measured power-delay profile in this fashion normally contains a number of peaks 284, 285, 286, 287, 288, 289. Each peak corresponds to one or more scatterers in the region surrounding the transmitting and receiving sounder units. The height of the peak corresponds to the total intensity of the reflection from the scatterer(s), and the width of the peak corresponds to cross-section of the scatterer(s). The first (lowest-delay) peak 284 corresponds to the direct, or line-of-sight, path between the transmitting and receiving sounder units, provided that such a line-of-sight path exists. It will be apparent to persons skilled in the art that analysis of the power-delay profile from any sounder unit will provide information such as the number of scatterers present in the surrounding region within the range of the sounder units 10, 11, 12, as well as the properties of those scatterers. In addition, the lowest-delay peak 284 provides information about the attenuation experienced by the line-of-sight path through the region.

Figure 17:
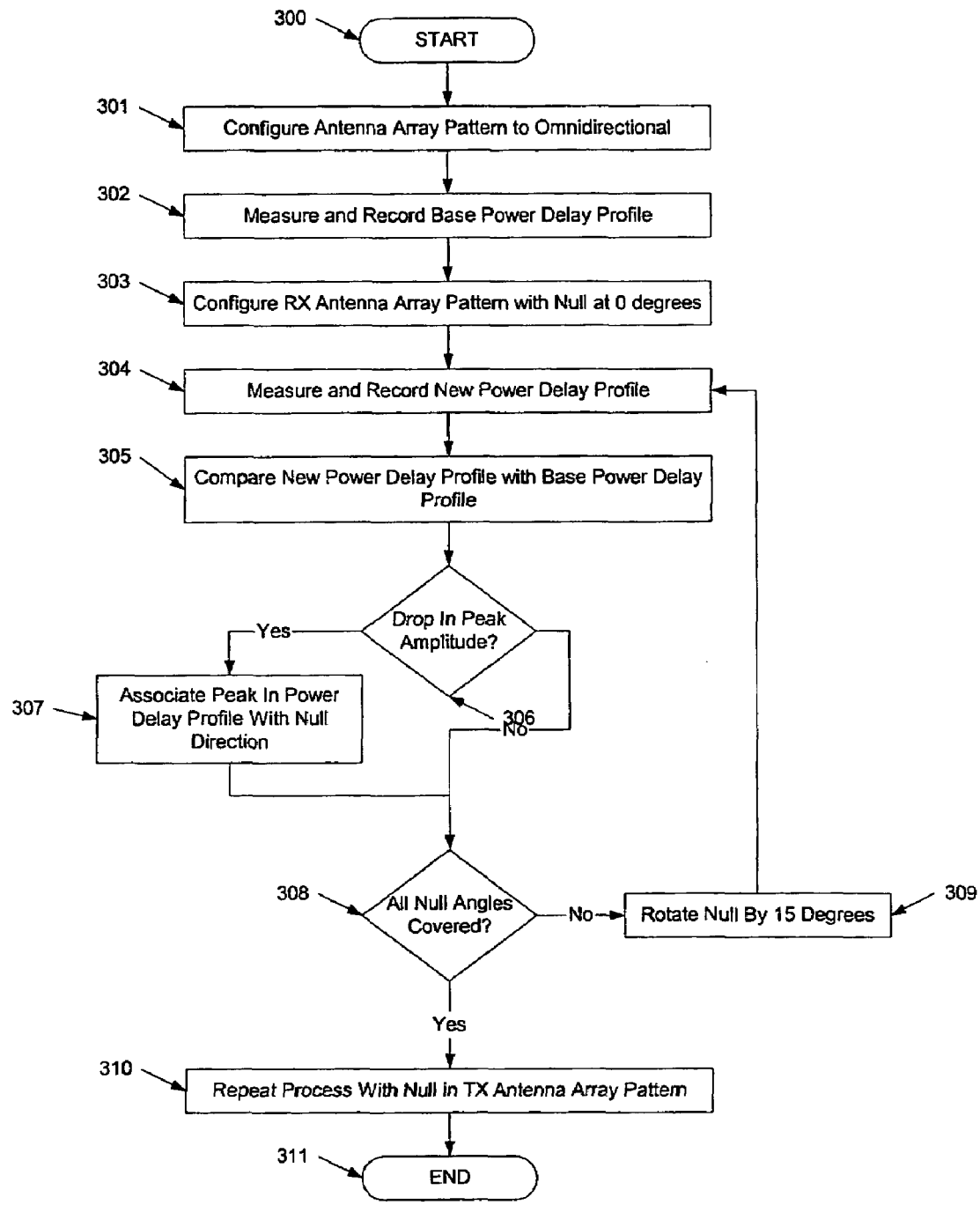
FIG. 17 is a representation of the process used by the central controller to associate a specific direction of arrival or transmission with a peak in a measured power-delay profile.

The RF propagation analysis process carried out by the measurement system requires not only identifying the nature of the scatterers within the surrounding region but also localizing their position within the region. With reference to FIG. 17, the process of localizing specific scatterers (corresponding to specific peaks in power-delay profile 280) with respect to their position in the surrounding region may comprise the steps of:

(a) at step 301, configuring the antenna radiation pattern 100 produced by antenna array 30 in both the transmitting and receiving sounder units to be an omnidirectional pattern;

(b) at step 302, measuring and storing a base power-delay profile in the receiving sounder unit;

(c) at step 303, configuring a null at an azimuth direction of 0 degrees in the antenna radiation pattern 100 produced by the receiving sounder unit;

(d) at step 304, measuring a second power-delay profile in the receiving sounder unit;

(e) at step 305, comparing the second power-delay profile with the base power-delay profile stored at step 302;

(f) at step 306, checking whether any of the peaks in the second power-delay profile have dropped in amplitude relative to the same peak in the base power-delay profile by a predetermined threshold amount;

(g) at step 307, if one or more peaks have dropped in amplitude, associating that peak in the power-delay profile with the azimuth direction of the null induced in antenna radiation pattern 100;

(h) at step 308, checking to see if additional angles in the azimuth direction remain to be covered by the null induced in antenna radiation pattern 100;

(i) if additional angles remain, at step 309 rotating the direction of the null induced in antenna radiation pattern 100 by a predetermined angle, preferably 15 degrees, and repeating the process of steps 304, 305, 306, 307 and 308 until all possible directions have been covered; and (j) at step 310, repeating the process of steps 303, 304, 305, 306, 307, 308 and 309, but this time with an omnidirectional radiation pattern 100 for antenna array 30 in the receiving sounder unit, and a null induced in radiation pattern 100 for antenna array 30 in the transmitting sounder unit.

Figure 19:
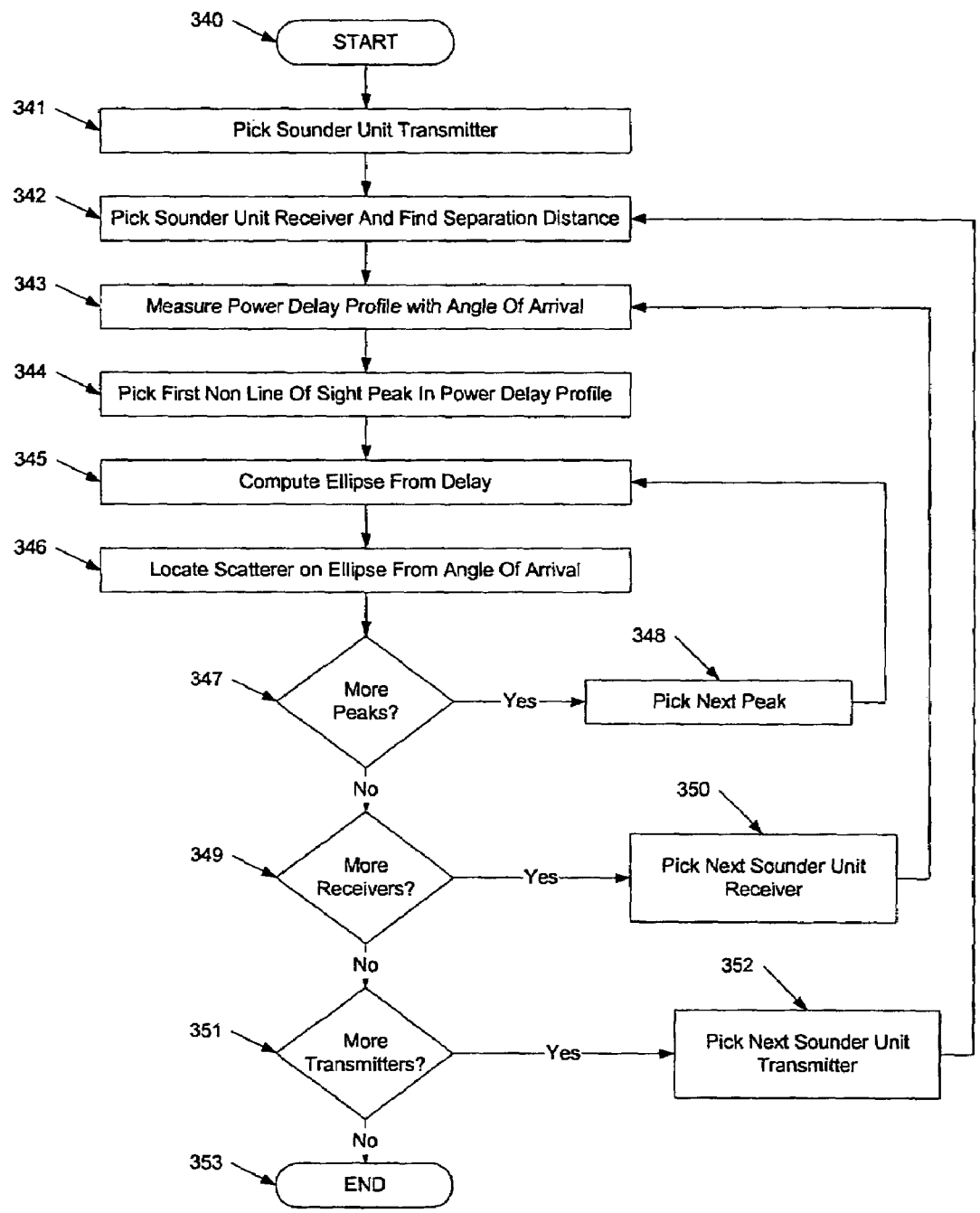
FIG. 19 is a representation of the process used by the central controller to correlate specific scatterers to elements of the power-delay profiles.

The information gathered by the process depicted in FIG. 17 preferably associates specific directions with specific scatterers (corresponding to peaks 284, 285, 286, 287, 288, 289 in example power-delay profile 280), relative to the positions of a transmitting sounder unit, for example 10, and a receiving sounder unit, for example 11. The process may further associate separate directions for a given peak (i.e., scatterer) relative to the transmitting sounder unit and receiving sounder unit. The absolute locations of these sounder units, for example 10 and 11, within the region being measured may preferably be determined by means of location processors 40 within these sounder units. The absolute location of the specific scatterers can then be deduced by triangulation, preferably using a geometric method as depicted in FIG. 19 and described in the accompanying text.

In some cases, multiple scatterers may correspond to a single peak of the power-delay profile measured at step 302 in FIG. 17. These scatterers can be separated to within the angular resolution of the sounder units by means of the triangulation process. The excess delay of the peak in the power-delay profile may preferably be used to further localize the position of the multiple scatterers.

In addition to localizing the positions of the scatterers within the region surrounding the sounder units 10, 11, 12, it is necessary to determine the attenuation properties of the region in order to fully calculate the RF propagation characteristics of the space. It is well known in the prior art that the RF path loss within different indoor spaces may be approximated by standard propagation models having a number of site-specific parameters. The attenuation properties of the region are preferably characterized by calculating, using a process of successive refinement, the site-specific parameters of a particular propagation model from the actual attenuation measured over a plurality of line-of-sight paths within the region.

Figure 18:
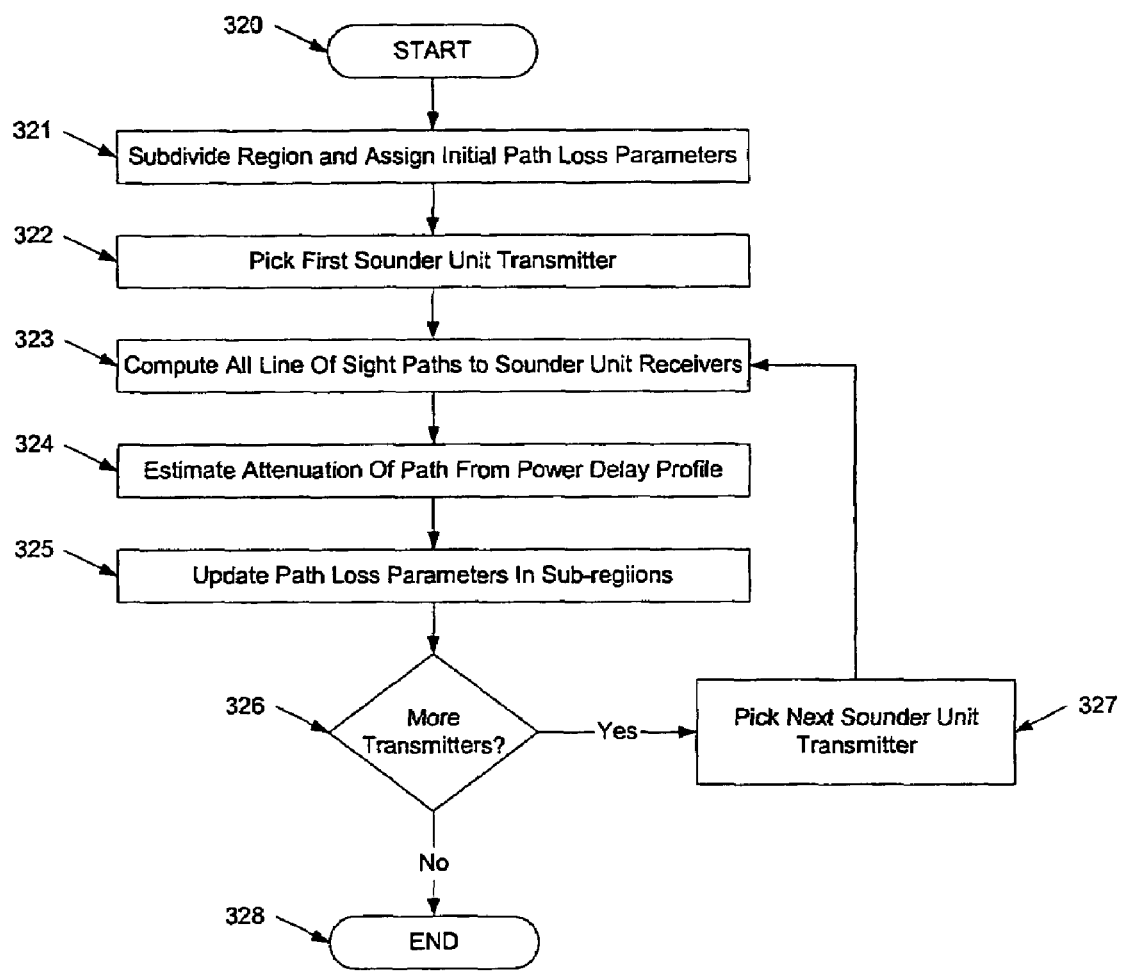
FIG. 18 is a representation of the process used by the central controller to correlate the attenuation properties of the environment to elements of the power-delay profiles.

With reference to FIG. 18, the process of determining the attenuation properties of the region may comprise the steps of:

(a) at step 321, subdividing the region to be measured (for example, measurement region 13 enclosed by sounder units 10, 11, 12) into sub-regions, preferably in a regular fashion, and assigning initial values to the parameters of a predetermined path loss model;

(b) at step 322, selecting a first sounder unit, for example 10, to transmit RF energy into the region;

(c) at step 323, computing line-of-sight paths from the sounder unit selected in step (b) above to a plurality of second sounder units, for example 11, 12, that are configured to act as receivers;

(d) at step 324, measuring power-delay profiles between the first sounder unit selected in step 322 above to each of the plurality of second sounder units for which line-of-sight paths are computed in step 323 above, and estimating the attenuation of the line-of-sight paths from the amplitudes of the lowest-delay peaks in the power-delay profiles;

(e) at step 325, adjusting the values assigned to the parameters for each of the sub-regions along the various line-of-sight paths using a linear programming approach such that the overall attenuations computed by the propagation model corresponds to the actual attenuation measured by the sounder units acting as receivers;

(f) at step 326, checking if all sounder units have been selected to act as transmitters; and (g) at step 327, if additional sounder units remain to be selected as transmitters, selecting a next sounder unit, for example 11, to transmit RF energy into the region, and repeating the process of steps 323, 324, 325 and 326, further adjusting the values assigned to the parameters of the propagation model for each of the sub-regions along the various line-of-sight paths.

It is necessary to determine whether a line-of-sight path exists between any pair of sounder units, for example 10 and 11, before attempting to measure the attenuation and use it to compute the parameters of the propagation model. This may be done by locating the first peak in the power-delay profile, for example 284 in power-delay profile 280, and comparing the excess delay of this peak to the expected run-time of the line-of-sight path between the sounder units as calculated from their geometric coordinates. If the excess delay of the first peak is substantially in excess of the expected run-time of the line-of-sight, then no line-of-sight path exists and this pair of sounder units cannot be used for adjusting the parameters of the propagation model. In this situation, the sounder units may be physically relocated until line-of-sight paths are found to exist.

The non line-of-sight peaks in each power-delay profile (i.e., the peaks corresponding to a path delay greater than that of the line-of-sight path) correspond to specific scatterers in the environment surrounding the sounder units, for example 10, 11, 12. The possible locations of a given scatterer corresponding to the delay associated with a given peak lie on an ellipse, with the transmitting and receiving sounder units at the foci of the ellipse. If l represents the length of the non line-of-sight path as computed from the path delay, and d represents the distance between the transmitting and receiving sounder units, then the locus of the ellipse in the x-y plane is given by:

$$(4x^2/l^2)+(4y^2/(l^2-d^2))=1 \quad (2)$$

Once the locus of the ellipse corresponding to the position of a given scatterer has been determined, the exact location of the scatterer may preferably be found using the angle of arrival and departure information associated with the peak in the power-delay profile corresponding to the scatterer. This may be done by determining the intersection of rays drawn from the transmitting and receiving sounder units at the respective angles with the locus of the ellipse. With reference to FIG. 19, the procedure for using the power-delay profiles calculated by the post-processing units in sounder units 10, 11, 12 to determine the locations of the scattering elements within measurement region 13 preferably includes the steps of:

(a) at step 341, selecting a first sounder unit, for example 10, to transmit RF energy into the region;

(b) at step 342, selecting a second sounder unit, for example 11, to receive and process the RF energy, and determining its distance from the first sounder unit selected in step 341, preferably using data obtained from location processor 40;

(c) at step 343, measuring the power-delay profile between the first sounder unit selected as in step 341 to the second sounder unit selected in step 342, and associating specific angles of arrival for each peak in the power-delay profile with respect to the transmitting sounder unit, for example 10, and the receiving sounder unit, for example 11;

(d) at step 344, selecting a first non line-of-sight peak in the power-delay profile measured at step 343 above, by selecting the first peak with a delay greater than the estimated line-of-sight path delay between the first and second sounder units;

(e) at step 345, calculating the total path delay between the first and second sounder units (corresponding to the delay of the peak selected in step 344), converting the path delay into a path length (by multiplying by the speed of electromagnetic waves), and then calculating the locus of the ellipse on which the scatterer must lie by using equation (2) above;

(f) at step 346, locating the scatterer on the locus of the ellipse computed in step 345, using the angle of departure at the transmitting sounder unit, for example 10, and the angle of arrival at the receiving sounder unit, for example 11;

(g) at step 347, checking if additional peaks remain to be selected in the power-delay profile;

(h) at step 348, if additional peaks remain to be selected in the power-delay profile, then selecting the next peak and repeating steps 345, 346 and 347 to determine the locations of additional scatterers, until no more peaks remain;

(i) at step 349, checking if additional receiving sounder units remain to be selected for participating in the measurement process;

(j) at step 350, if additional receiving sounder units remain, then selecting the next sounder unit, for example 12, and repeating steps 343, 344, 345, 346, 347 and 348 to determine the locations of additional scatterers, until no more sounder units remain;

(k) at step 351, checking if additional transmitting sounder units remain to be selected for participating in the measurement process;

(l) at step 352, if additional transmitting sounder units remain, then selecting the next sounder unit, for example 11, and repeating steps 342, 343, 344, 345, 346, 347, 348, 349, 350 and 351 until no more sounder units remain; and (m) at step 353, terminating the process and reporting the results in terms of the number and positions of scatterers found in the environment.

In step 346, if the intersection of the locus of the ellipse as computed in step 345 with the angle of departure at the transmitting sounder unit does not exactly match the intersection of the locus of the ellipse with the angle of arrival at the receiving sounder unit, the average of these intersections is taken as the location of the scatterer.

Figure 20:
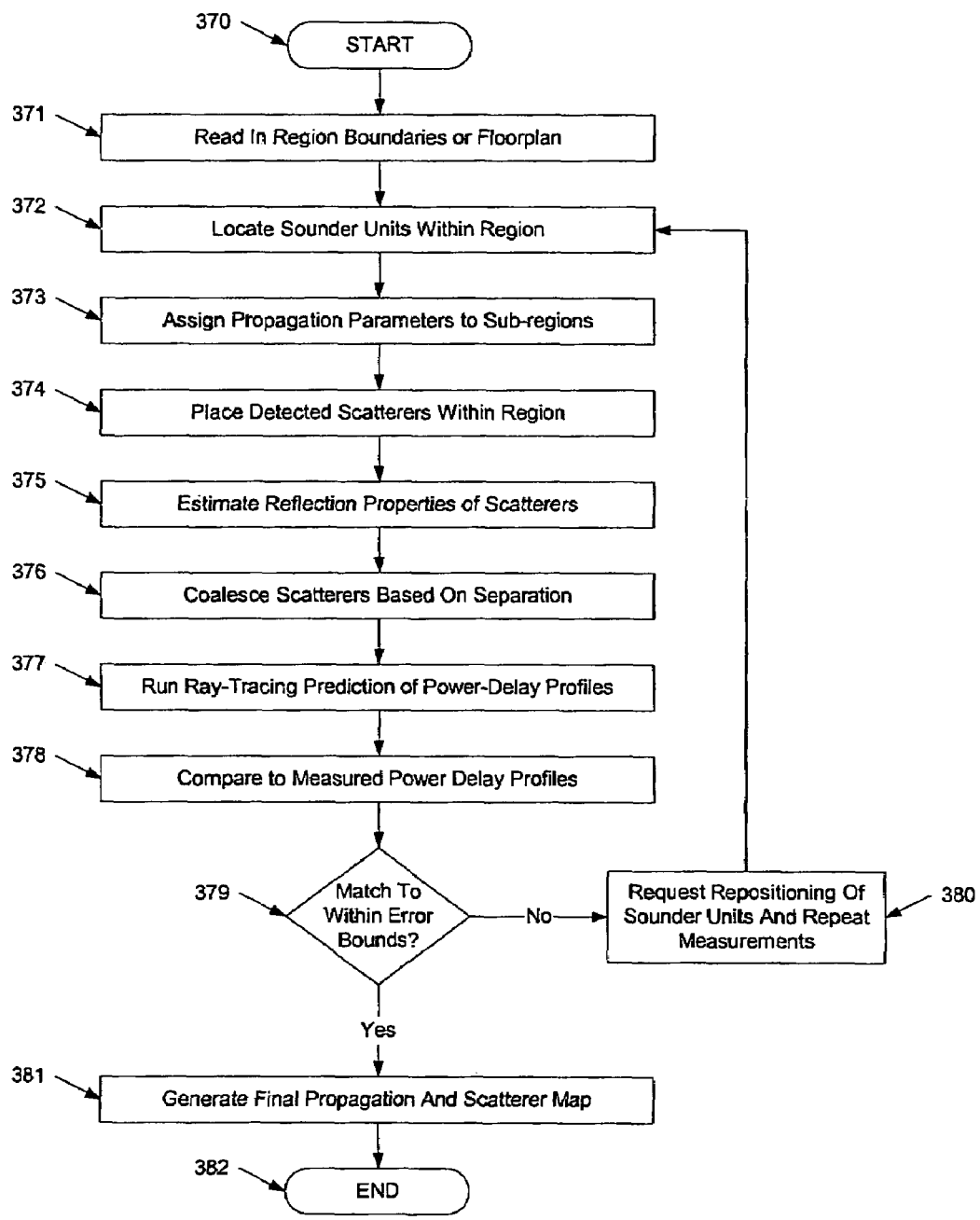
FIG. 20 is a representation of the process used by the central controller for accumulating results from multiple sounder units and correlating them into a single representation of the propagation characteristics of the region.

In some preferred embodiments of the present invention, after the attenuation properties of the measurement region 13 have been determined, and the scatterers within the region have been located, central controller 14 may preferably perform a final calculation procedure to combine the data from multiple sounder units, for example 10, 11, 12, determine whether the measurement accuracy falls within user-defined limits, and present the results to the user. With reference to FIG. 20, this procedure may comprise the steps of:

(a) at step 371, reading in a general floorplan of the building, for example 20, or otherwise determining the internal and external boundaries of measurement region 13;

(b) at step 372, locating the sounder units 10, 11, 12 within the boundaries determined at step 371, preferably using data obtained from location processor 40 within each sounder unit 10;

(c) at step 373, subdividing measurement region 13 and calculating the parameters of an indoor propagation model for each sub-region as an average of the parameters obtained by measurements performed by a plurality of pairs of sounder units, said measurements being preferably made according to the process depicted in FIG. 18 and described in the accompanying text;

(d) at step 374, determining the locations of all of the scatterers within measurement region 13, preferably according to the process depicted in FIG. 19 and described in the accompanying text;

(e) at step 375, using the relative amplitudes as well as the angles of arrival and departure associated with the peaks in the power-delay profiles measured by the sounder units to estimate the reflection properties of each scatterer within measurement region 13;

(f) at step 376, partitioning the scatterers within measurement region 13 into groups, such that all scatterers within a given group are less than a predetermined distance from each other, and, for each group, coalescing the scatterers to create a larger virtual scatterer containing all of the scatterers in the group and having the averaged reflection properties of the scatterers in the group;

(g) at step 377, performing a standard ray-tracing electromagnetic propagation simulation using the data generated during steps 373 and 376 to predict the power-delay profiles that should result at each of the sounder units, for example 10, 11, 12, as a consequence of the attenuation and scattering properties of measurement region 13;

(h) at step 378, comparing the predicted power-delay profiles from step 377 to the actual power-delay profiles measured by the sounder units;

(i) at step 379, checking if the predicted power-delay profiles match the measured power-delay profiles to within predetermined limits of error;

(j) at step 380, if the predicted power-delay profiles do not match the measured power-delay profiles, then requesting the user to reposition the sounder units 10, 11, 12 within measurement region 13 and take additional measurements to provide more data points for the attenuation and scattering calculations;

(k) at step 381, if the predicted power-delay profiles match the measured power-delay profiles, then accepting the attenuation and scattering properties calculated for measurement region 13 during steps 373 and 376, and using them to calculate and display a final propagation and scatterer map, preferably in measurement results window 254 of GUI 250; and (l) at step 382, terminating the process and waiting for further user input.

The process of performing a ray-tracing electromagnetic propagation simulation using the attenuation and scattering properties of a region is well known in the prior art and will not be described here further. The final propagation and scatterer map may calculate loci of constant attenuation within measurement region 13, and draw these as contours 255 in measurement results window 254 of GUI 250, preferably superimposed on a depiction of the floorplan, for example 256. The scatterers are also depicted in their computed locations upon floorplan 256. It is apparent that the detailed propagation information presented in measurement results window 254 is sufficient to enable prediction of all of the RF propagation effects within indoor measurement region 13. This propagation information may be stored or further manipulated as desired by the user of the propagation measurement system.

Measurements over a period of time may be performed by repeating the measurement process multiple times at regular intervals. Central controller 14 may preferably receive the information for each measurement, perform calculations according to the process depicted in FIG. 20 and described in the accompanying text, and store the resulting information as a record of the propagation characteristics of measurement region 13 at the corresponding instant in time. A series of such measurements may be stored to provide the user of the system with a view of the properties of measurement region 13 over time.

Each sounder unit 10 should preferably present its operational status continuously to the central controller 14 for display in the sounder unit status window 252 of GUI 250. The status information displayed may include: the health of the sounder unit (whether running, idle or faulty); the current location of the sounder unit in three dimensions; and the current transmit power and receiver sensitivity settings.

Figure 21:
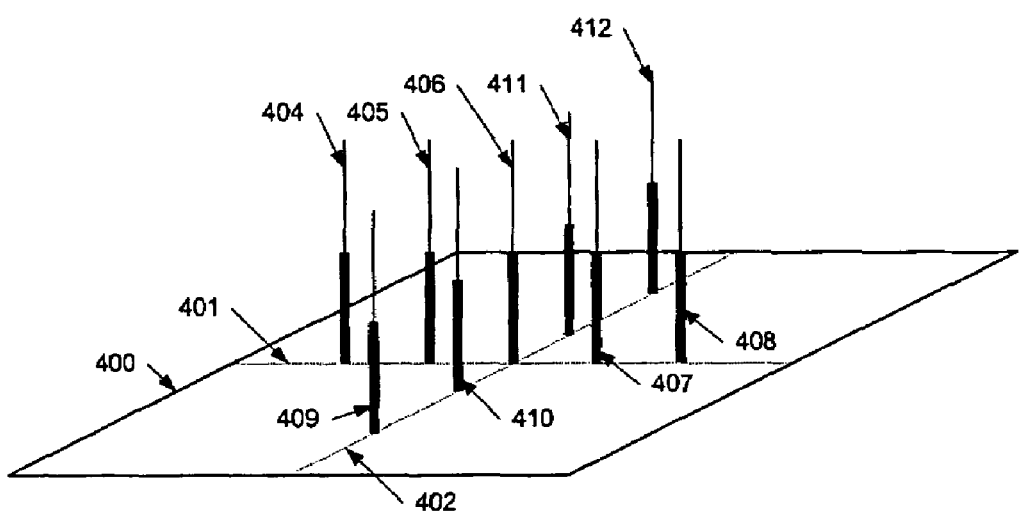
FIG. 21 is a depiction of the mechanical arrangement of an antenna array used in accordance with another preferred embodiment of the sounder unit.
Figure 22:
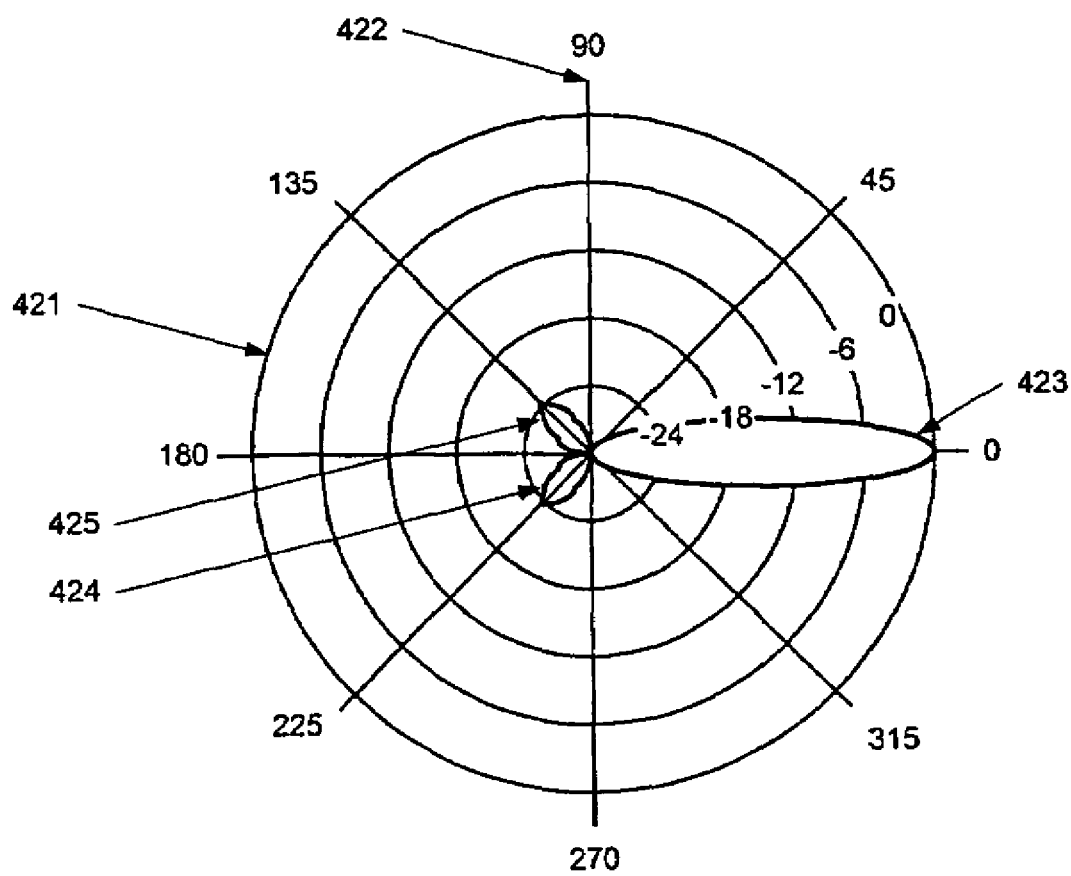
FIG. 22 is a representation of the radiation pattern (in the azimuthal direction) produced by the antenna array of FIG. 21.

In another embodiment of the present invention, antenna array 30 may generate a radiation pattern corresponding to a beam rather than a null. With reference to FIG. 21, antenna array 30 may comprise a large number of vertical radiators 404, 405, 406, 407, 408, 409, 410, 411, 412 mounted on a ground plane 400 in two rows 401 and 402. Such a large array of radiators, when driven by a corresponding number of channels within beamformer 31 in sounder unit 10, is capable of creating a beam-shaped radiation pattern, as depicted for example in FIG. 22. With reference to FIG. 22, adjusting the relative phases and amplitudes of the signals applied to vertical radiators 404, 405, 406, 407, 408, 409, 410, 411, 412 may create a beam-shaped radiation pattern with a main lobe 423 and a plurality of small sidelobes, for example 424 and 425, as plotted on azimuth plot 421 with cardinal directions 422.

This beam-shaped radiation pattern may be advantageously used to determine the arrival or departure direction associated with each peak in the power-delay profile, for example 280, as measured by the sounder units, without creating unwanted radiation in other directions as may be encountered when using a cardioid type radiation pattern, for example 90, and hence improving the sensitivity and accuracy of the measurements. The procedure of determining the arrival or departure directions may exactly be the same as that depicted in FIG. 17 and described in the accompanying text, with the exception that instead of checking for a drop in the amplitude of a peak at step 306, a rise in the amplitude of a peak is checked for instead. The remainder of the measurement and calculation procedures are unchanged. The process of calculating the phase and amplitude adjustments in order to steer the direction of beam 423 while minimizing the sidelobes, for example 424 and 425, is well known in the prior art and will not be described here further.

In another embodiment of the present invention, antenna array 30 may be advantageously replaced with an antenna or antenna array having an omnidirectional pattern, for example a single vertical radiator mounted above a ground plane, and beamformer 31 may preferably be omitted. The RF output from channel sounder transmitter 33 and RF input to channel sounder receiver 32 may be connected directly to the antenna or antenna array. This eliminates the ability to determine the precise location of the scatterers in the measurement region 13, but also enables a significant reduction in the overall cost and size of each sounder unit 10.

In another embodiment of the present invention, beamformer 31 and antenna array 30 may advantageously be replaced by a simple passive directional antenna, for example a horn, dish or array, having a beam shaped radiation pattern, for example 423. This directional antenna may be mechanically steered to orient the main lobe of the antenna radiation pattern in any desired direction, thereby achieving the same effect as that of electrically steering a beam or null but without the cost and complexity of beamformer 31. The process of mechanically steering a directional antenna is well known in the prior art and will not be described here further.

In another embodiment of the present invention, sounder unit 10 may advantageously implement the functions necessary to perform propagation measurements on multiple frequency bands, for example 2.4 GHz and 5.6 GHz. A multi-band sounder unit may be realized in different ways. For example, a multi-band sounder unit may be created by duplicating the functions of antenna array 30, beamformer 31, channel sounder receiver 32 and channel sounder 33, and enabling each duplicated set of functions to operate on a different frequency band. As another example, a multi-band sounder unit may be created by using a multi-band antenna array 30 and band-switching the components of beamformer 31, channel sounder receiver 32 and channel sounder 33. The use of multi-band sounder units enables the propagation characteristics of measurement region 13 to be measured at different frequency bands without requiring two or more independent sets of sounder units operating in the different frequency bands of interest.

In another embodiment of the present invention, the propagation measurements performed on multiple frequency bands by sounder unit 10 may advantageously be combined to obtain a more accurate measurement of the attenuation properties of the measurement region 13. It is well known that the propagation characteristics of an indoor region are highly dependent on the frequency band being used. The data obtained by measuring the attenuation properties and scatterer locations of measurement region 13 in more than one frequency band may be combined during steps 373, 375 and 376 in the process depicted in FIG. 20 and described in the accompanying text, to produce a more accurate representation of the propagation characteristics of the measurement region.

In another embodiment of the present invention, one or more of sounder units 10, 11, 12 may contain only channel sounder transmitter 33, omitting channel sounder receiver 32; or one or more of sounder units 10, 11, 12 may contain only channel sounder receiver 32, omitting channel sounder transmitter 33. This enables additional sounder units to be located in measurement region 13 without significantly increasing the cost of the complete system.

In another embodiment of the present invention, antenna array 30 may advantageously be replaced with an antenna array that is capable of controlling its radiation pattern over three dimensions rather than two dimensions (i.e., in both azimuth and elevation, rather than only in azimuth). This may enable sounder units 10, 11, 12 to be used to determine the location of scatterers in a three-dimensional volume rather than over a two-dimensional area. The procedures for computing the attenuation characteristics and locating the scatterers are preferably the same as for the two-dimensional case, with the exception that the null or beam is steered in three dimensions.

In another embodiment of the present invention, the sliding correlator channel sounding method utilizing PRBS patterns, as used by channel sounder transmitter 33 and channel sounder receiver 32, may be replaced by another channel sounding method that is capable of generating a power-delay profile. Examples of alternate channel sounding methods are impulse-based channel sounding and swept-frequency (chirp) channel sounding with an inverse Fourier transform.

It is apparent that the teachings of the present invention enable the RF propagation characteristics of an indoor environment to be measured in a simpler and more deterministic manner. It is further apparent that the present invention enables RF propagation measurements to be made over a two-dimensional area in an automatic manner using a relatively small number of measuring instruments. It is further apparent that the present invention provides for the time-varying RF propagation characteristics of an indoor environment to be measured and recorded.

Accordingly, while this invention has been described with reference to illustrative embodiments, this description is not intended to be construed in a limiting sense. Various modifications of the illustrative embodiments, as well as other embodiments of this invention, will be apparent to persons skilled in the art upon reference to this description without departing from the scope of the invention, which is defined solely by the claims appended hereto.

What is claimed is:

1. A distributed radio frequency (RF) propagation measurement system for automatically characterizing RF properties of a predefined physical space, said system comprising:
    a single central controller;
    a plurality of sounder units controllable by said central controller, each sounder unit including,
        antenna array means adjustable for directionally transmitting and receiving RF energy,
        a channel sounder transmitter,
        a channel sounder receiver, and
        a processing means for calculating a plurality of power-delay profiles from RF energy received by said channel sounder receiver;
    synchronization means for aligning frequency and phase of said channel sounder transmitters and said channel sounder receivers within said plurality of sounder units;
    communication means for transferring data and commands between said central controller and said plurality of sounder units;
    location determining means to measure position of said plurality of sounder units within said predetermined physical space;
    software means for sequencing operation of said plurality of sounder units, adjusting directionality of said antenna array means and combining said plurality of power-delay profiles obtained from said plurality of sounder units in conjunction with said location determining means to obtain RF scattering and attenuation properties; and
    control means for controlling said plurality of sounder units in accordance with said software means;
    wherein said distributed RF propagation measurement system automatically obtains RF scattering and attenuation properties in at least two dimensions within said predefined physical space.

2. The system as claimed in claim 1 wherein said central controller is embodied in software executed by a host computer, said software for performing user interface functions along with communication and coordination of said plurality of sounder units forming said distributed channel sounder.

3. The system as claimed in claim 1 wherein said antenna array uses beamforming means to transmit and receive RF energy with distinct directional characteristics.

4. The system as claimed in claim 3 wherein said antenna array and beamforming means further include operational mechanisms for performing operations selected from the group consisting of phasing, gain control, power division, and power combining.

5. The system as claimed in claim 1 wherein said channel sounder transmitter generates RF stimulus signals that are transmitted into said predefined physical space.

6. The system as claimed in claim 5 wherein said channel sounder receiver processes RF signals received from within said predefined physical space and obtains said power-delay profiles indicative of RF propagation channel characteristics.

7. The system as claimed in claim 1 wherein said location determining means measures a precise three-dimensional coordinate of each of said plurality of sounder units relative to said central controller.

8. The system as claimed in claim 7 wherein said location determining means is configured for use with a Global Positioning System (GPS).

9. The system as claimed in claim 7 wherein said location determining means uses an independent location determining capability that employs pseudolites to provide accurate spatial references from which three-dimensional vectors are computable.

10. The system as claimed in claim 7 wherein said sounder units communicate said precise three-dimensional coordinates of each of said plurality of sounder units to said central controller.

11. The system as claimed in claim 1 wherein said communication means uses a dedicated Ultra High Frequency (UHF) radio data link to communicate with said central controller.

12. The system as claimed in claim 1 wherein said control means resides as software within an embedded controller, and controls and coordinates activities of said distributed channel sounder formed by said plurality of sounding units.

13. The system as claimed in claim 1 wherein said control means resides as software within a Central Processing Unit (CPU), and controls and coordinates activities of said distributed channel sounder formed by said plurality of sounding units.

14. The system as claimed in claim 1 wherein said channel sounder transmitter and said channel sounder receiver are formed by a sliding correlator function.

15. The system as claimed in claim 1 wherein said synchronization means includes clock synchronization signals derived from location determining signals utilized by said location determining means.

16. The system as claimed in claim 1 wherein said predefined physical space is a Wireless Local Area Network (WLAN).

17. The system as claimed in claim 1 wherein said predefined physical space is a Wireless Local Area Network (WLAN) and said distributed channel sounder performs RF propagation measurements in three dimensions.

* * * * *